United States Patent
Horn et al.

(10) Patent No.: US 10,581,581 B2
(45) Date of Patent: *Mar. 3, 2020

(54) TECHNIQUES FOR ENABLING QUALITY OF SERVICE (QOS) ON WLAN FOR TRAFFIC RELATED TO A BEARER ON CELLULAR NETWORKS

(71) Applicant: QUALCOMM Incorporated, San Diego, CA (US)

(72) Inventors: Gavin Bernard Horn, La Jolla, CA (US); Abhijit S. Khobare, San Diego, CA (US); Ajay Gupta, San Diego, CA (US); Fang Chen, San Diego, CA (US); Vikas Jain, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/804,066

(22) Filed: Nov. 6, 2017

(65) Prior Publication Data

US 2018/0062819 A1     Mar. 1, 2018

Related U.S. Application Data

(63) Continuation of application No. 14/094,445, filed on Dec. 2, 2013, now Pat. No. 9,819,469.

(Continued)

(51) Int. Cl.
*H04W 4/00* (2018.01)
*H04L 5/00* (2006.01)
(Continued)

(52) U.S. Cl.
CPC .......... *H04L 5/0058* (2013.01); *H04W 28/24* (2013.01); *H04W 84/12* (2013.01)

(58) Field of Classification Search
None
See application file for complete search history.

(56) References Cited

U.S. PATENT DOCUMENTS 7,206,324 B2   4/2007   Persson et al.
7,817,554 B2   10/2010   Skog et al.
(Continued)

FOREIGN PATENT DOCUMENTS

CN     101218783 A     7/2008
EP     1843530 A2     10/2007
(Continued)

OTHER PUBLICATIONS

Golmie N., et al., "Normative Text Proposal for QoS", 21-06-0598-05-0000-QoSProposal, IEEE P802.21/D01.09; Sep. 18, 2006, URL: http://ieee802.org/21/doctree/2006_Meeting_Docs/2006-09_meeting_docs/21-06-0598-05-0000-QoSProposal.doc, 8 pages, paragraph 5.1.3.

(Continued)

*Primary Examiner* — Kwang B Yao
*Assistant Examiner* — Juvena W Loo
(74) *Attorney, Agent, or Firm* — Dalei Dong; Holland & Hart LLP

(57) ABSTRACT

Techniques are described for managing QoS parameters of a bearer for which at least a portion of bearer data is served over a WLAN radio access technology. According to these techniques, a first device may identify a first set of one or more QoS parameters for serving a bearer over a wireless wide area network (WWAN). The first device may also determine a second set of one or more QoS parameters for serving the bearer over the WLAN based on an association between the first set of QoS parameters and the second set of one or more QoS parameters.

30 Claims, 21 Drawing Sheets

Related U.S. Application Data

(60) Provisional application No. 61/841,566, filed on Jul. 1, 2013.

(51) Int. Cl.
*H04W 28/24* (2009.01)
*H04W 84/12* (2009.01)

(56) References Cited

U.S. PATENT DOCUMENTS

| | | |
|---|---|---|
| 8,331,375 B2 | 12/2012 | Babbar et al. |
| 8,626,172 B2 | 1/2014 | Dravida et al. |
| 8,717,900 B2 | 5/2014 | Williams et al. |
| 2005/0210154 A1 | 9/2005 | Verma et al. |
| 2007/0070958 A1 | 3/2007 | Rinne et al. |
| 2011/0044198 A1 | 2/2011 | Persson et al. |
| 2013/0083661 A1* | 4/2013 | Gupta ............ H04W 4/70 370/235 |
| 2013/0136036 A1 | 5/2013 | Chen et al. |
| 2013/0155851 A1 | 6/2013 | Koodli et al. |
| 2014/0003239 A1* | 1/2014 | Etemad ............ H04W 28/08 370/235 |
| 2014/0043979 A1* | 2/2014 | Etemad ............ H04W 4/70 370/237 |
| 2014/0050086 A1* | 2/2014 | Himayat ............ H04N 21/2365 370/230 |
| 2014/0064068 A1* | 3/2014 | Horn ............ H04W 28/0289 370/230 |
| 2014/0098789 A1 | 4/2014 | Liu et al. |
| 2014/0112146 A1 | 4/2014 | Hu et al. |
| 2014/0254498 A1* | 9/2014 | Mueck ............ H04W 72/02 370/329 |
| 2014/0376515 A1* | 12/2014 | Lei ............ H04W 36/0061 370/331 |
| 2015/0003435 A1 | 1/2015 | Horn et al. |
| 2015/0124601 A1 | 5/2015 | Li et al. |
| 2015/0156774 A1* | 6/2015 | Urie ............ H04L 5/001 370/329 |
| 2015/0305070 A1 | 10/2015 | Ahmad |
| 2016/0044567 A1 | 2/2016 | Baghel et al. |
| 2016/0066234 A1 | 3/2016 | Cho et al. |
| 2016/0242235 A1* | 8/2016 | Vasudevan ............ H04W 88/06 |
| 2016/0249253 A1 | 8/2016 | Redana et al. |
| 2016/0330646 A1 | 11/2016 | Hu et al. |

FOREIGN PATENT DOCUMENTS

| | | |
|---|---|---|
| JP | 2010045812 A | 2/2010 |
| JP | 2010529815 A | 8/2010 |
| JP | 2014512762 A | 5/2014 |
| JP | 2014518481 A | 7/2014 |
| JP | 2014520439 A | 8/2014 |
| JP | 2015520576 A | 7/2015 |
| WO | WO-2006137705 A1 | 12/2006 |
| WO | WO-2007021951 A2 | 2/2007 |
| WO | WO-2008154329 A1 | 12/2008 |
| WO | WO-2012103737 A1 | 8/2012 |
| WO | WO-2012135793 A2 | 10/2012 |
| WO | WO-2012167743 A1 | 12/2012 |
| WO | WO-2013082798 A1 | 6/2013 |
| WO | WO-2013171365 A1 | 11/2013 |

OTHER PUBLICATIONS

Co-pending U.S. Appl. No. 61/808,492, filed Apr. 4, 2013, 46 pgs.
ISA/EP, International Search Report and Written Opinion of the International Searching Authority, Int'l Application No. PCT/US2014/043801, dated Oct. 9, 2014, European Patent Office, Rijswijk, NL, 10 pgs.
Ericsson: "Integrated Policy Control & Charging Architecture for Mobile Broadband", Apr. 18, 2012, 62 pages.
Majkowski J., et al., "Enhanced TXOP Scheme for Efficiency Improvement of WLAN IEEE 802 .11e", 2006 IEEE 64th Vehicular Technology Conference:VTC 2006-Fall; 25—28, Sep. 2006, Montreal, Quebec, Canada, Piscataway, NJ: IEEE Operations Center, Sep. 1, 2006 (Sep. 9, 2006), pages 1-5, XP031051540, ISBN: 978-1-4244-0062-1.

* cited by examiner

| QCI | WLAN AC | Example Service |
|---|---|---|
| 1 | AC_VO | Conversational voice |
| 2 | AC_VI | Conversational video (live streaming) |
| 3 | AC_VO | Real-time Gaming |
| 4 | AC_VI | Non-conversational Video (Buffered Streaming) |
| 5 | AC_VO | IMS Signaling |
| 6 | AC_BE | Video (Buffered Streaming), TCP-based (e.g., www, email, chat, ftp, p2p file sharing, progressive video, etc.) |
| 7 | AC_BE | Voice, Video (live streaming), Interactive Gaming |
| 8 | AC_BE | Video (Buffered Streaming), TCP-based (e.g., www, email, chat, ftp, p2p file sharing, progressive video, etc.) |
| 9 | AC_BK | Video (Buffered Streaming), TCP-based (e.g., www, email, chat, ftp, p2p file sharing, progressive video, etc.) |

FIG. 8A

| 802.1q PCP | 802.11e AC |
|---|---|
| 1 | AC_VO |
| 2 | AC_VI |
| 0 | AC_VO |
| 3 | AC_VI |
| 4 | AC_VO |
| 5 | AC_BE |
| 6 | AC_BE |
| 7 | AC_BE |

| QCI | WLAN AC (802.11e) | WLAN PCP (802.1q) |
|---|---|---|
| 1 | AC_VO | 6 |
| 2 | AC_VI | 5 |
| 3 | AC_VO | 6 |
| 4 | AC_VI | 5 |
| 5 | AC_VO | 6 |
| 6 | AC_BE | 0 |
| 7 | AC_BE | 0 |
| 8 | AC_BE | 0 |
| 9 | AC_BK | 1 |

FIG. 8C

TECHNIQUES FOR ENABLING QUALITY OF SERVICE (QOS) ON WLAN FOR TRAFFIC RELATED TO A BEARER ON CELLULAR NETWORKS

CROSS-REFERENCE

The present application in a continuation of U.S. patent application Ser. No. 14/094,445, entitled "Techniques for Enabling Quality of Service (QoS) on WLAN for Traffic Related to a Bearer on Cellular Networks," filed Dec. 2, 2013, which claims priority benefit of U.S. Provisional Application No. 61/841,566, entitled "Method And Apparatus For Enabling Quality Of Service (QoS) on WLAN for Traffic Related to a Bearer on Cellular Networks," filed Jul. 1, 2013, assigned to the assignee hereof, and each of which is expressly incorporated by reference herein.

FIELD OF THE DISCLOSURE

The present disclosure is related to wireless communications. More specifically, the present disclosure is directed to techniques for enabling Quality of Service (QoS) on WLAN for traffic related to a bearer on cellular networks.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and Single-Carrier FDMA (SC-FDMA) systems.

Generally, a wireless multiple-access communications system may include a number of base stations, each simultaneously supporting communication for multiple mobile devices. Base stations may communicate with mobile devices on downstream and upstream links. The downlink (or forward link) refers to the communication link from an eNodeB or other base station to a user equipment (UE), and the uplink (or reverse link) refers to the communication link from the UE to the eNodeB or other base station. Each base station has a coverage range, which may be referred to as the coverage area of the cell.

Traffic between a UE and the core network may be conveyed over a bearer having a defined minimum Quality of Service (QoS), which is enforced by a cellular radio access network. However, in certain networks, bearer traffic to or from a multi-mode UE may be steered over a wireless local area network (WLAN) rather than the traditional cellular radio access network. In such cases, the cellular radio access network may not be able to enforce the QoS of the bearer over WLAN, which may cause the QoS to fall below the established minimum for the bearer.

SUMMARY

The described features generally relate to techniques for maintaining the QoS defined for a bearer while transmitting at least a portion of the data for the bearer over a WLAN connection. Further scope of the applicability of the described methods and apparatuses will become apparent from the following detailed description, claims, and drawings. The detailed description and specific examples are given by way of illustration only, as various changes and modifications within the spirit and scope of the description will become apparent to those skilled in the art.

A method of wireless communication is described. The method may include receiving, at a first device, a connection message from a base station, identifying, at the first device, a first set of bearer parameters from the connection message, determining, at the first device, whether a bearer type parameter is included in the first set of bearer parameters, the bearer type parameter indicating that a radio bearer is associated with a wide wireless area network (WWAN) or both the WWAN and a local wireless area network (WLAN), and routing, at the first device and based at least in part on the determination that the bearer type parameter is included in the first set of bearer parameters, the radio bearer based at least in part on the bearer type parameter.

An apparatus for wireless communication is described. The apparatus may include means for receiving, at the apparatus, a connection message from a base station, means for identifying, at the apparatus, a first set of bearer parameters from the connection message, means for determining, at the apparatus, whether a bearer type parameter is included in the first set of bearer parameters, the bearer type parameter indicating that a radio bearer is associated with a WWAN or both the WWAN and a WLAN, and means for routing, at the apparatus and based at least in part on the determination that the bearer type parameter is included in the first set of bearer parameters, the radio bearer based at least in part on the bearer type parameter.

Another apparatus for wireless communication is described. The apparatus may include a processor, memory in electronic communication with the processor, and instructions stored in the memory. The instructions may be operable to cause the processor to receive, at the apparatus, a connection message from a base station, identify, at the apparatus, a first set of bearer parameters from the connection message, determine, at the apparatus, whether a bearer type parameter is included in the first set of bearer parameters, the bearer type parameter indicating that a radio bearer is associated with a WWAN or both the WWAN and a WLAN, and route, at the apparatus and based at least in part on the determination that the bearer type parameter is included in the first set of bearer parameters, the radio bearer based at least in part on the bearer type parameter.

A non-transitory computer-readable medium for wireless communication is described. The non-transitory computer-readable medium may include instructions operable to cause a processor to receive, at a first device, a connection message from a base station, identify, at the first device, a first set of bearer parameters from the connection message, determine, at the first device, whether a bearer type parameter is included in the first set of bearer parameters, the bearer type parameter indicating that a radio bearer is associated with a WWAN or both the WWAN and a WLAN, and route, at the first device and based at least in part on the determination that the bearer type parameter is included in the first set of bearer parameters, the radio bearer based at least in part on the bearer type parameter.

Some examples of the method, apparatus, and non-transitory computer-readable medium described above may further include processes, features, means, or instructions for selecting the second network device based at least in part on an identification associated with the target base station, a support of the bypass handover message by the second network device, or a combination thereof.

Some examples of the method, apparatus, and non-transitory computer-readable medium described above may further include processes, features, means, or instructions for determining, at the first device, that the bearer type parameter included in the first set of bearer parameters indicates that the radio bearer is to be switched from the WWAN to the WLAN, and switching the radio bearer from the WWAN to the WLAN based at least in part on the bearer type parameter, wherein routing the radio bearer is based at least in part on switching the radio bearer.

In some examples of the method, apparatus, and non-transitory computer-readable medium described above, the first set of bearer parameters include a WLAN quality-of-service (QoS) parameter to provide a QoS parameter to be associated with the radio bearer when the radio bearer is switched between the WWAN and the WLAN.

Some examples of the method, apparatus, and non-transitory computer-readable medium described above may further include processes, features, means, or instructions for determining, at the first device, that the bearer type parameter included in the first set of bearer parameters indicates that the radio bearer is to be switched from the WWAN to both the WWAN and the WLAN. In some cases, the first set of bearer parameters includes a WLAN QoS parameter to provide a QoS parameter to be associated with the radio bearer when the radio bearer is switched between the WWAN and both the WWAN and the WLAN.

Some examples of the method, apparatus, and non-transitory computer-readable medium described above may further include processes, features, means, or instructions for mapping, at the first device, a first QoS parameter associated with the WWAN to a second QoS parameter associated with the WLAN based at least in part on the WLAN QoS parameter.

In some examples of the method, apparatus, and non-transitory computer-readable medium described above, the first QoS parameter is a QoS class identifier (QCI) of the radio bearer associated with the WWAN and the second QoS parameter is a WLAN access category (AC) associated with the WLAN.

In some examples of the method, apparatus, and non-transitory computer-readable medium described above, the mapping comprises a static mapping or a semi-static mapping. Some examples of the method, apparatus, and non-transitory computer-readable medium described above may further include processes, features, means, or instructions for determining, at the first device, whether an identity parameter included in the first set of bearer parameters is part of a current configuration of the first device, wherein the radio bearer is associated with the identity parameter.

In some examples of the method, apparatus, and non-transitory computer-readable medium described above, routing the radio bearer is based at least in part on determining that the identity parameter included in the first set of bearer parameters is part of the current configuration of the first device.

Some examples of the method, apparatus, and non-transitory computer-readable medium described above may further include processes, features, means, or instructions for transmitting, at the first device, a connection completion message based at least in part on routing the radio bearer In some examples of the method, apparatus, and non-transitory computer-readable medium described above, the connection message is a radio resource control (RRC) connection reconfiguration message and the connection completion message is an RRC connection reconfiguration complete message. In some examples of the method, apparatus, and non-transitory computer-readable medium described above, the radio bearer comprises an evolved packet system (EPS) bearer.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 8A, 8B, and 8C are block diagrams conceptually illustrating examples of predetermined associations between WWAN and WLAN QoS parameters, in accordance with an aspect of the present disclosure;

DETAILED DESCRIPTION

Figure 1:
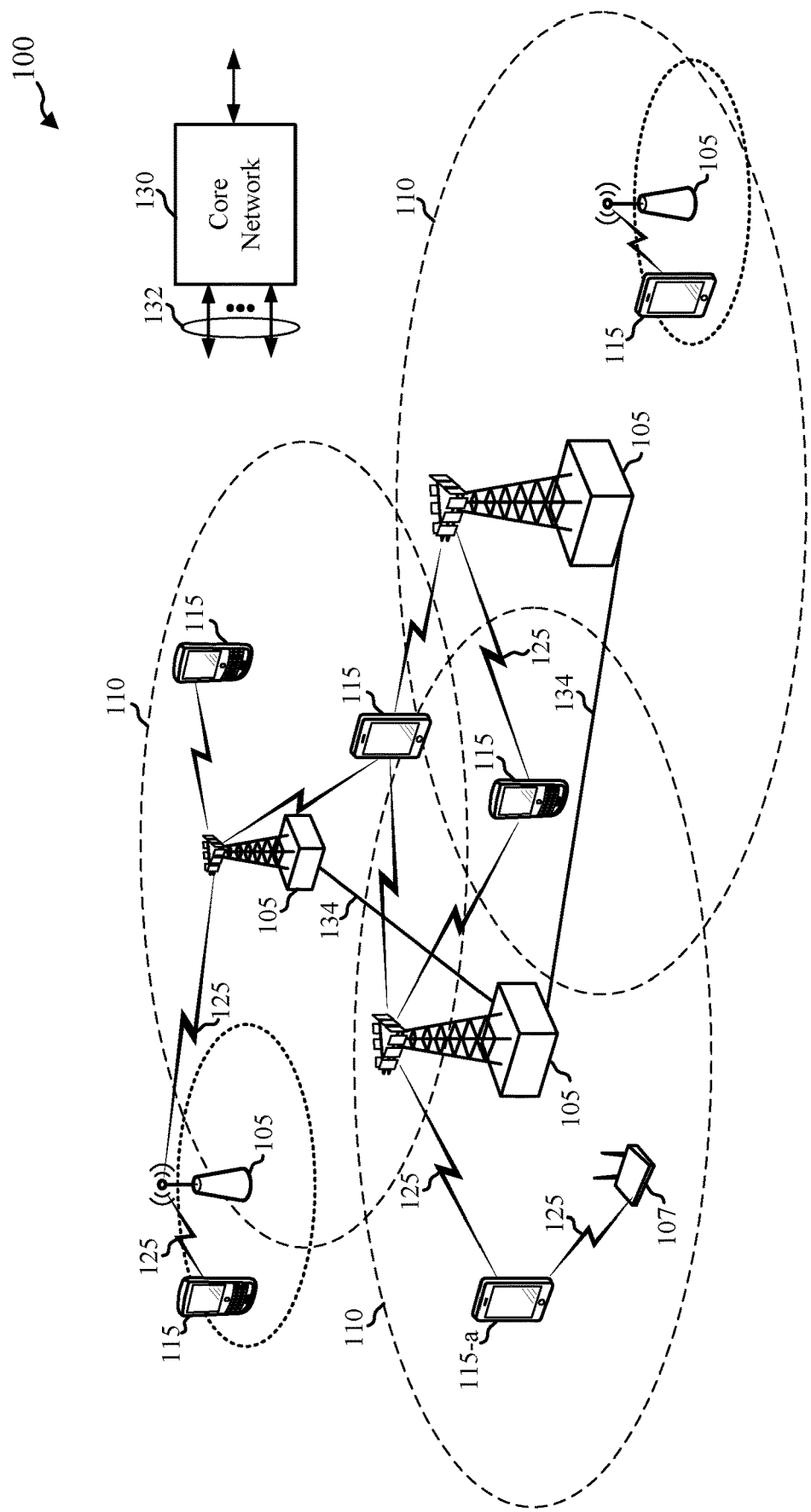
FIG. 1 shows a block diagram conceptually illustrating an example of a telecommunications system, in accordance with an aspect of the present disclosure.

The present disclosure describes techniques for managing QoS parameters of a bearer for which at least a portion of bearer data is served over a WLAN radio access technology. According to these techniques, a first device may identify a first set of one or more QoS parameters for serving a bearer over a wireless wide area network (WWAN). The first device may also determine a second set of one or more QoS parameters for serving the bearer over the WLAN based on an association between the first set of QoS parameters and the second set of one or more QoS parameters. In certain examples, the first device may map the first set of one or more QoS parameters to a second set of one or more QoS parameters according to a predetermined relationship. Data for the bearer may then be served over the WLAN using the second set of QoS parameters.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

As used in the present description and the appended claims, the term "bearer" refers to a link between two nodes in a communication network.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1x/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards.

Referring first to FIG. 1, a diagram illustrates an example of a wireless communications system 100, in accordance with an aspect of the present disclosure. The wireless communications system 100 includes WWAN base stations (or cells) 105, user equipment (UEs) 115, and a core network 130. The WWAN base stations 105 may communicate with the UEs 115 under the control of a base station controller (not shown), which may be part of the core network 130 or the WWAN base stations 105 in various embodiments. WWAN base stations 105 may communicate control information and/or user data with the core network 130 through core network backhaul links 132. In embodiments, the WWAN base stations 105 may communicate, either directly or indirectly, with each other over inter-base station backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described elsewhere in this specification. Each modulated signal may be sent on a different carrier and may carry control information (e.g., reference signals, control channels, etc.), overhead information, data, etc.

The WWAN base stations 105 may wirelessly communicate with the UEs 115 via one or more base station antennas. Each of the WWAN base stations 105 sites may provide communication coverage for a respective coverage area 110. In some embodiments, a WWAN base station 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include WWAN base stations 105 of different types (e.g., macro, micro, and/or pico base stations). There may be overlapping coverage areas for different technologies.

In embodiments, the wireless communications system 100 is an LTE/LTE-A network communication system. In LTE/LTE-A network communication systems, the terms evolved Node B (eNodeB) may be generally used to describe the WWAN base stations 105. The wireless communications system 100 may be a Heterogeneous LTE/LTE-A network in which different types of eNodeBs provide coverage for various geographical regions. For example, each WWAN base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area (e.g., buildings) and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. An eNodeB may support one or multiple (e.g., two, three, four, and the like) cells.

The core network 130 may communicate with the eNodeBs or other WWAN base stations 105 via a core network backhaul link 132 (e.g., S1 interface, etc.). The WWAN base stations 105 may also communicate with one another, e.g., directly or indirectly via inter-base station backhaul links 134 (e.g., X2 interface, etc.) and/or via core network backhaul links 132 (e.g., through core network 130). The system 100 may support synchronous or asynchronous operation. For synchronous operation, the WWAN base stations may have similar frame timing, and transmissions from different WWAN base stations may be approximately aligned in time. For asynchronous operation, the WWAN base stations may have different frame timing, and transmissions from different eNodeBs may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to a WWAN base station 105, and/or downlink (DL) transmissions, from a WWAN base station 105 to a UE 115. The downlink transmissions may also be called forward link transmissions while the uplink transmissions may also be called reverse link transmissions.

In certain examples, a UE 115 may be capable of simultaneously communicating with a WWAN base station 105 and a WLAN access point 107. In such examples, the WWAN base station 105 or the UE 115 may steer or divert data transmissions between the UE 115 and the WWAN base station 105 over to WLAN (e.g., through communication with the WLAN access point 107) to increase bandwidth, manage loading, or optimize resource utilization of the WWAN base station 105. Nevertheless, some or all of the traffic steered from the WWAN network to the WLAN may relate to bearers associated with minimum QoS requirements.

The UE 115 and/or the WWAN base station 105 may be configured to, for one or more of the affected bearers, identify a first set of one or more QoS parameters associated with serving the bearer over WWAN (i.e., the LTE network), then map the first set of one or more QoS parameters to a second set of one or more parameters associated with serving the bearer over WLAN. Once the mapped second set of one or more QoS parameters has been determined, the UE 115 may communicate with the WLAN access point 107 to configure the bearer over WLAN using the second set of QoS parameters, thereby maintaining at least the minimum QoS specified for the bearer at the WLAN (e.g., Wi-Fi network). The WLAN access point 107 may configure one or more data bearers between the UE 115 and the core network 130.

Figure 2:
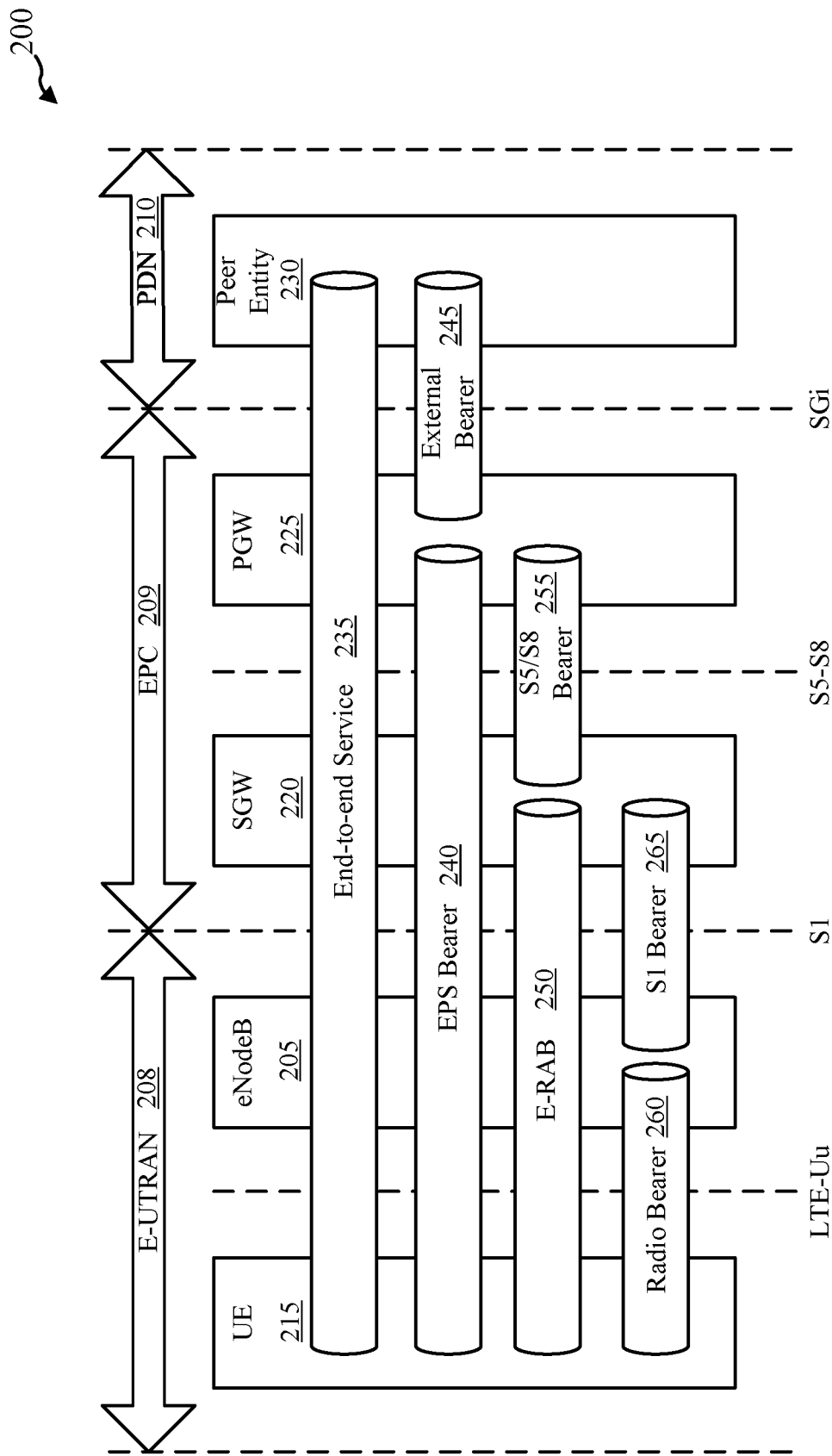
FIG. 2 is a block diagram conceptually illustrating an example of a bearer architecture in a telecommunications system, in accordance with an aspect of the present disclosure.

FIG. 2 is a block diagram conceptually illustrating an example of a bearer architecture in a telecommunications system, in accordance with an aspect of the present disclosure used to provide an end-to-end service 235 between UE 215 and a peer entity 230 addressable over a network. The peer entity 230 may be a server, another UE, or another type of network-addressable device. The end-to-end service 235 may forward data between UE 215 and the peer entity 230 according to a set of QoS characteristics associated with the end-to-end service. The end-to-end service 235 may be implemented by at least the UE 215, an eNodeB 205, a serving gateway (SGW) 220, a packet data network (PDN) gateway (PGW) 225, and the peer entity 230. The UE 215 and eNodeB 205 may be components of an evolved UMTS terrestrial radio access network (E-UTRAN) 208, the air interface of the LTE wireless communication standard. Serving gateway 220 and PDN gateway 225 may be components of an evolved Packet Core (EPC) 209, the core network architecture of the LTE wireless communication standard. The peer entity 230 may be an addressable node on a packet data network (PDN) 210 communicatively coupled with the PDN gateway 225.

The end-to-end service 235 may be implemented by an evolved packet system (EPS) bearer 240 between the UE 215 and the PDN gateway 225, and by an external bearer 245 between the PDN gateway 225 and the peer entity 230 over an SGi interface. The SGi interface may expose an internet protocol (IP) or other network-layer address of the UE 215 to the PDN 210.

The EPS bearer 240 may be an end-to-end tunnel defined to a specific QoS. Each EPS bearer 240 may be associated with a plurality of parameters, for example, a QoS class identifier (QCI), an allocation and retention priority (ARP), a guaranteed bit rate (GBR), and an aggregate maximum bit rate (AMBR). The QCI may be an integer indicative of a QoS class associated with a predefined packet forwarding treatment in terms of latency, packet loss, GBR, and priority. In certain examples, the QCI may be an integer from 1 to 9. The ARP may be used by a scheduler of an eNodeB 205 to provide preemption priority in the case of contention between two different bearers for the same resources. The GBR may specify separate downlink and uplink guaranteed bit rates. Certain QoS classes may be non-GBR such that no guaranteed bit rate is defined for bearers of those classes.

The EPS bearer 240 may be implemented by an E-UTRAN radio access bearer (E-RAB) 250 between the UE 215 and the serving gateway 220, and an S5/S8 bearer 255 between the serving gateway 220 and the PDN gateway over an S5 or S8 interface. S5 refers to the signaling interface between the serving gateway 220 and the PDN gateway 225 in a non-roaming scenario, and S8 refers to an analogous signaling interface between the serving gateway 220 and the PDN gateway 225 in a roaming scenario. The E-RAB 250 may be implemented by a radio bearer 260 between the UE 215 and the eNodeB 205 over an LTE-Uu air interface, and by an S1 bearer 265 between the eNodeB and the serving gateway 220 over an S1 interface.

It will be understood that, while FIG. 2 illustrates the bearer hierarchy in the context of an example of end-to-end service 235 between the UE 215 and the peer entity 230, certain bearers may be used to convey data unrelated to end-to-end service 235. For example, radio bearers 260 or other types of bearers may be established to transmit control data between two or more entities where the control data is unrelated to the data of the end-to-end service 235.

As discussed above with respect to FIG. 1, data related to one or more EPS bearers 240 or may be offloaded from the LTE air interface to a WLAN interface between the UE 215 and a WLAN access point 107 (not shown). Depending on the system configuration, the WLAN access point 107 may then forward the bearer data to the eNodeB 205, the serving gateway 220, and the PDN gateway 225, or directly to the peer entity 230 over the PDN 210. Steering bearer traffic from the LTE air interface to the WLAN interface may improve overall bandwidth and resource utilization of the LTE network. However, because the eNodeB 205 typically controls the scheduling of traffic only over the LTE air interface and not the WLAN interface, steering bearer data traffic to the WLAN interface may prevent the eNodeB 205 from enforcing QoS parameters associated with the EPS bearers 240.

To address this issue, the UE 215, eNodeB 205, serving gateway 220, PDN gateway 225, and/or other nodes may determine a first set of one or more QoS parameters (e.g., a QCI) associated with serving the bearer slated for WWAN steering, and map the first set of one or more QoS parameters to a second set of one or more QoS parameters (e.g., a WLAN access category (AC)) associated with serving the bearer over WLAN. The WLAN may then transmit the offloaded bearer traffic using the second set of one or more QoS parameters identified for the bearer traffic. In this way, the QoS of bearer traffic offloaded to the WLAN may be managed by such that the WLAN provides the bearer traffic at a QoS that meets or exceeds the QoS defined for the bearer on the WWAN to maintain the quality of the end-to-end service 235.

Figure 3A:
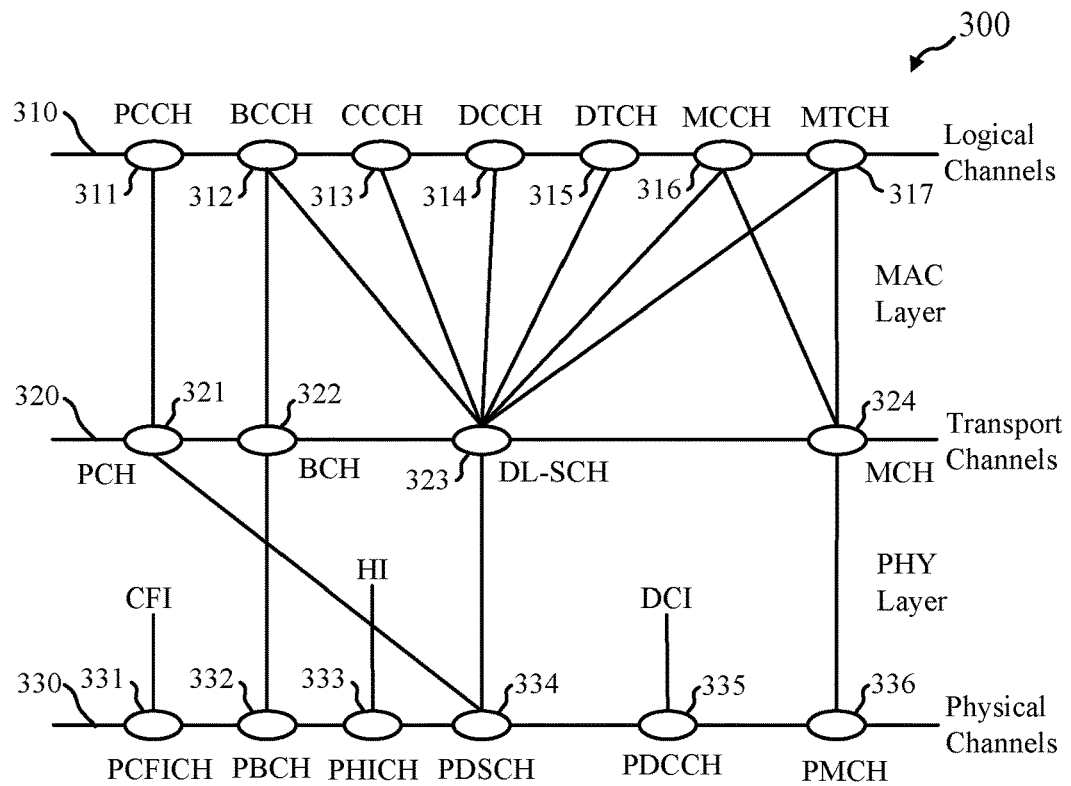
FIG. 3A is a block diagram conceptually illustrating an example of downlink channels in a telecommunications system, in accordance with an aspect of the present disclosure.
Figure 3B:
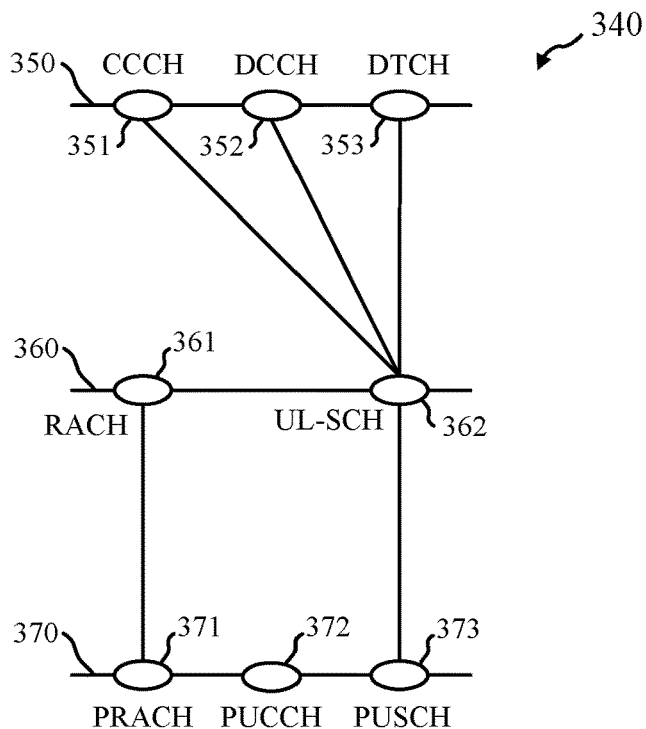
FIG. 3B is a block diagram conceptually illustrating an example of uplink channels in a telecommunications system, in accordance with an aspect of the present disclosure.

FIG. 3A is a block diagram conceptually illustrating an example of downlink channels in a telecommunications system, in accordance with an aspect of the present disclosure, and FIG. 3B is a block diagram conceptually illustrating an example of uplink channels in a telecommunications system, in accordance with an aspect of the present disclosure. The channelization hierarchy may be implemented by, for example, the wireless communications system 100 of FIG. 1. Downlink channelization hierarchy 300 may illustrate, for example, channel mapping between downlink logical channels 310, downlink transport channels 320, and downlink physical channels 330 of an LTE/LTE-A network.

Downlink logical channels 310 may be classified into Control Channels and Traffic Channels. Each downlink logical channel 310 may be associated with a separate radio bearer 260 (shown in FIG. 2); that is, there may be a one-to-one correlation between downlink logical channels 310 and radio bearers 260. The radio bearers 260 conveying data (e.g., for EPS bearers 240) may be referred to as data radio bearers (DRBs), while radio bearers 260 conveying control data (e.g., for control channels) may be referred to as control radio bearers (CRBs).

Logical control channels may include a paging control channel (PCCH) 311, which is the downlink channel that transfers paging information, a broadcast control channel (BCCH) 312, which is the downlink channel for broadcasting system control information, and a multicast control channel (MCCH) 316, which is a point-to-multipoint downlink channel used for transmitting multimedia broadcast and multicast service (MBMS) scheduling and control information for one or several multicast traffic channels (MTCHs) 317.

Generally, after establishing radio resource control (RRC) connection, MCCH 316 may only be used by the user equipments that receive MBMS. Dedicated control channel (DCCH) 314 is another logical control channel that is a point-to-point bi-directional channel transmitting dedicated control information, such as user-specific control information used by the user equipment having an RRC connection. Common control channel (CCCH) 313 is also a logical control channel that may be used for random access information. Logical traffic channels may include a dedicated traffic channel (DTCH) 315, which is a point-to-point bi-directional channel dedicated to one user equipment for the transfer of user information and a MTCH 317, which may be used for point-to-multipoint downlink transmission of traffic data.

The communication networks that accommodate some of the various embodiments may additionally include logical transport channels that are classified into downlink (DL) and uplink (UL). The downlink transport channels 320 may include a Paging Channel (PCH) 321, a broadcast channel (BCH) 322, a downlink shared data channel (DL-SCH) 323, and a multicast channel (MCH) 324.

The physical channels may also include a set of downlink physical channels 330 and uplink physical channels 370. In some disclosed embodiments, the downlink physical channels 330 may include a physical broadcast channel (PBCH) 332, a physical control format indicator channel (PCFICH) 331, a physical downlink control channel (PDCCH) 335, a physical hybrid ARQ indicator channel (PHICH) 333, a physical downlink shared channel (PDSCH) 334 and a physical multicast channel (PMCH) 336.

The uplink channelization hierarchy 340 of FIG. 3B may illustrate, for example, channel mapping between uplink logical channels 350, uplink transport channels 360, and uplink physical channels 370 for an LTE/LTE-A network. The uplink transport channels 360 may include a random access channel (RACH) 361, and an uplink shared data channel (UL-SCH) 362. The uplink physical channels 370 may include at least one of a physical random access channel (PRACH) 371, a physical uplink control channel (PUCCH) 372, and a physical uplink shared channel (PUSCH) 373.

Figure 4:
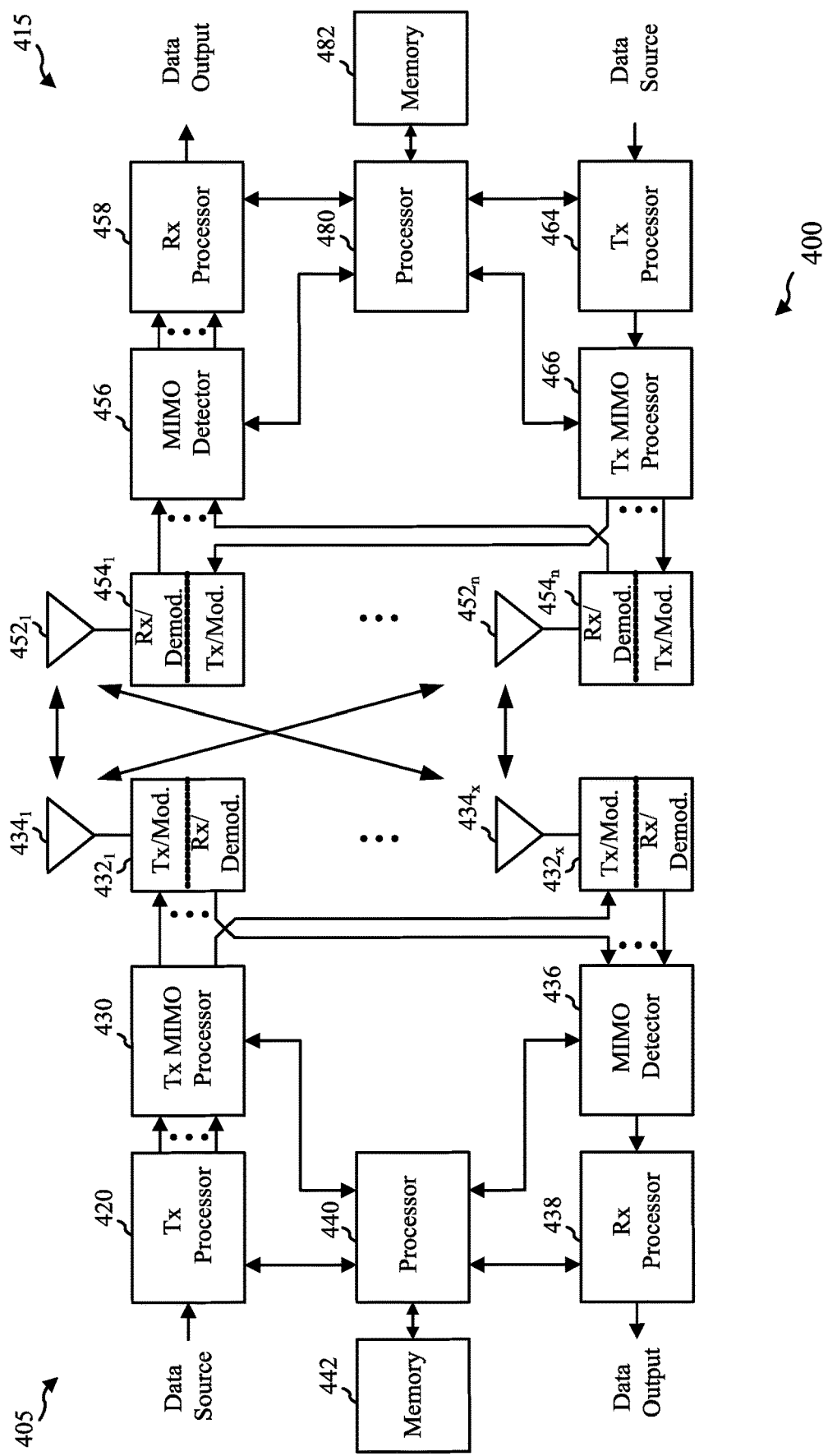
FIG. 4 is a block diagram conceptually illustrating a design of a base station and a UE, in accordance with an aspect of the present disclosure.

FIG. 4 is a block diagram conceptually illustrating a design of a WWAN base station 405 and a UE 415, in accordance with an aspect of the present disclosure. The eNodeB and UE may be part of a wireless communications system 400. This wireless communications system 400 may illustrate aspects of the wireless communications system 100 of FIG. 1 and/or WWAN bearer hierarchy 200 of FIG. 2. For example, the WWAN base station 405 may be an example of one or more of the WWAN base stations and/or eNodeBs described in other Figures, and the UE 415 may be an example of one or more of the UEs described with respect to other Figures.

The WWAN base station 405 may be equipped with base station antennas $434_1$ through $434_x$, where x is a positive integer, and the UE 415 may be equipped with UE antennas $452_1$ through $452_n$. In the wireless communications system 400, the WWAN base station 405 may be able to send data over multiple communication links at the same time. Each communication link may be called a "layer" and the "rank" of the communication link may indicate the number of layers used for communication. For example, in a 2×2 MIMO system where the WWAN base station 405 transmits two "layers," the rank of the communication link between the WWAN base station 405 and the UE 415 is two.

At the WWAN base station 405, a base station transmit processor 420 may receive data from a base station data source and control information from a base station processor 440. The control information may be for the PBCH, PCFICH, PHICH, PDCCH, etc. The data may be for the PDSCH, etc. The base station transmit processor 420 may process (e.g., encode and symbol map) the data and control information to obtain data symbols and control symbols, respectively. The base station transmit processor 420 may also generate reference symbols, e.g., for the PSS, SSS, and cell-specific reference signal. A base station transmit (TX) MIMO processor 430 may perform spatial processing (e.g., precoding) on data symbols, control symbols, and/or reference symbols, if applicable, and may provide output symbol streams to the base station modulator/demodulators $432_1$ through $432_x$. Each base station modulator/demodulator 432 may process a respective output symbol stream (e.g., for OFDM, etc.) to obtain an output sample stream. Each base station modulator/demodulator 432 may further process (e.g., convert to analog, amplify, filter, and upconvert) the output sample stream to obtain a downlink (DL) signal. In one example, DL signals from base station modulator/demodulators $432_1$ through $432_x$ may be transmitted via the base station antennas $434_1$ through $434_x$, respectively.

At the UE 415, the UE antennas $452_1$ through $452_n$ may receive the DL signals from the WWAN base station 405 and may provide the received signals to the UE modulator/demodulators $454_1$ through $454_n$, respectively. Each UE modulator/demodulator 454 may condition (e.g., filter, amplify, downconvert, and digitize) a respective received signal to obtain input samples. Each UE modulator/demodulator 454 may further process the input samples (e.g., for OFDM, etc.) to obtain received symbols. A UE MIMO detector 456 may obtain received symbols from all the UE modulator/demodulators $454_1$ through $454_n$, perform MIMO detection on the received symbols if applicable, and provide detected symbols. A UE receive (Rx) processor 458 may process (e.g., demodulate, deinterleave, and decode) the detected symbols, providing decoded data for the UE 415 to a data output, and provide decoded control information to a UE processor 480, or UE memory 482.

On the uplink (UL), at the UE 415, a UE transmit processor 464 may receive and process data from a UE data source. The UE transmit processor 464 may also generate reference symbols for a reference signal. The symbols from the UE transmit processor 464 may be precoded by a UE transmit MIMO processor 466 if applicable, further processed by the UE modulator/demodulators $454_1$ through $454_n$ (e.g., for SC-FDMA, etc.), and be transmitted to the WWAN base station 405 in accordance with the transmission parameters received from the WWAN base station 405. At the WWAN base station 405, the UL signals from the UE 415 may be received by the base station antennas 434, processed by the base station modulator/demodulators 432, detected by a base station MIMO detector 436 if applicable, and further processed by a base station receive processor. The base station receive processor 438 may provide decoded data to a base station data output and to the base station processor 440. The components of the UE 415 may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 400. Similarly, the components of the WWAN base station 405 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 400.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one configuration, the WWAN base station 405 and/or the UE 415 includes means for identifying a first set of one or more QoS parameters for serving a bearer over a wireless wide area network (WWAN), and means for determining a second set of one or more QoS parameters for serving the bearer over a WLAN based on an association between the first set of QoS parameters and the second set of QoS parameters. In one aspect, the aforementioned means may be the base station processor 440, the base station memory 442, the base station transmit processor 420, base station receive processor 438, the base station modulator/demodulators 432, and the base station antennas 434 of the WWAN base station 405 configured to perform the functions recited by the aforementioned means. In another aspect, the aforementioned means may be the UE processor 480, the UE memory 482, the UE transmit processor 464, UE receive processor 458, the UE modulator/demodulators 454, and the UE antennas 452 of the UE 415 configured to perform the functions recited by the aforementioned means.

Figure 5:
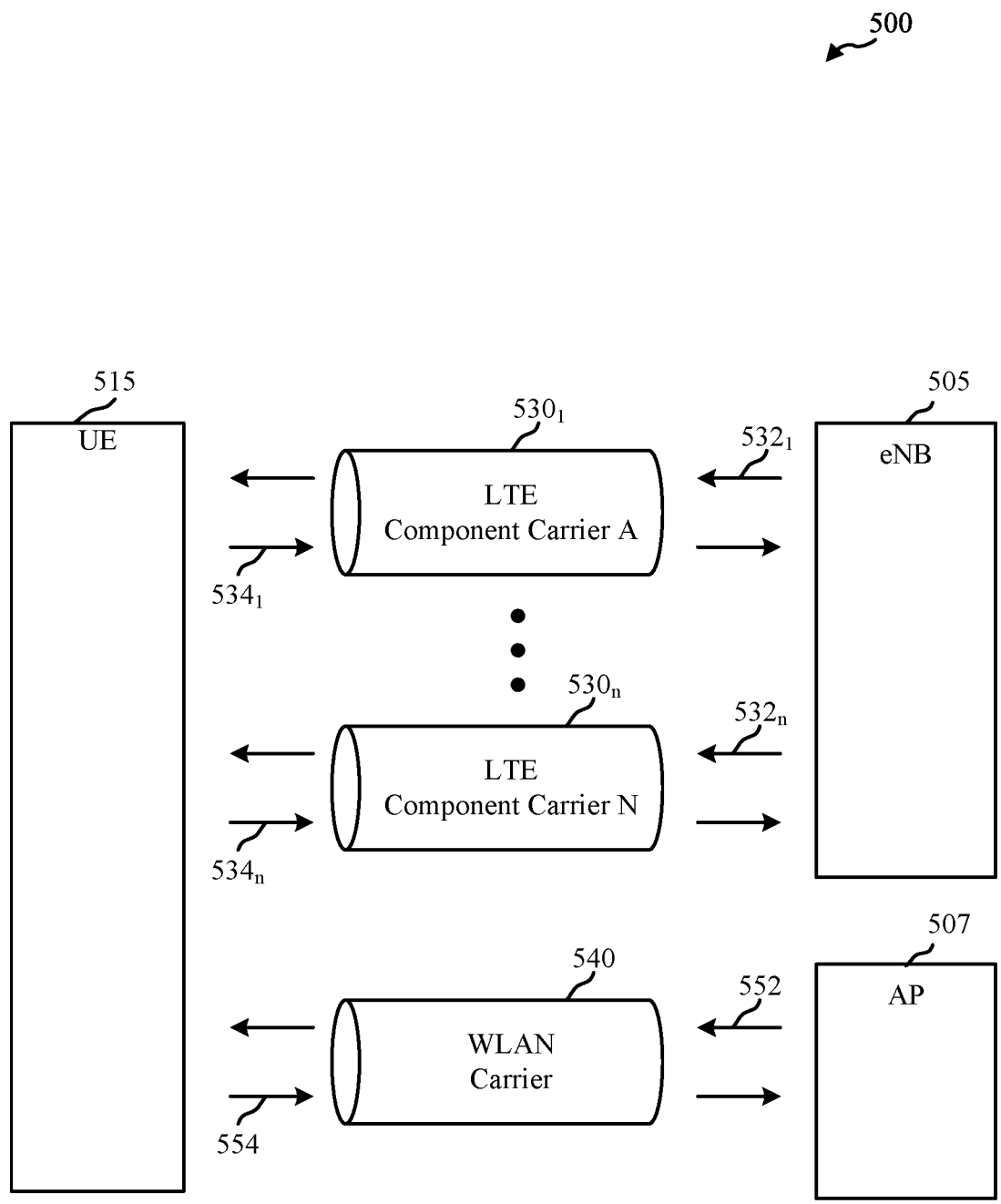
FIG. 5 is a block diagram conceptually illustrating an aggregation of LTE and WLAN radio access technologies at a user equipment (UE), in accordance with an aspect of the present disclosure.

FIG. 5 illustrates a block diagram conceptually illustrating an aggregation of LTE and WLAN radio access technologies at a user equipment (UE), in accordance with an aspect of the present disclosure. The aggregation may occur in a system 500 including a UE 515, which can communicate with an eNodeB 505 using one or more component carriers 1 through N ($CC_1$-$CC_N$), and with a WLAN access point (AP) 507 using WLAN carrier 540. The UE 515 may be an example of one or more of the UEs described with reference to other Figures. The eNodeB 505 may be an example of one or more of the WWAN base stations and/or eNodeBs described with reference to other Figures. While only one UE 515, one eNodeB 505, and one WLAN access point 507 are illustrated in FIG. 5, it will be appreciated that the system 500 can include any number of UEs 515, eNodeBs 505, and/or WLAN access points 507.

The eNodeB 505 can transmit information to the UE 515 over forward (downlink) channels $532_1$ through $532_N$ on LTE component carriers $530_1$ through $530_n$. In addition, the UE 515 can transmit information to the eNodeB 505 over reverse (uplink) channels $534_1$ through 534-N on LTE component carriers $CC_1$ though $CC_N$. Similarly, the WLAN access point 507 may transmit information to the UE 515 over forward (downlink) channel 552 on WLAN carrier 540. In addition, the UE 515 may transmit information to the WLAN access point 507 over reverse (uplink) channel 554 of WLAN carrier 540.

In describing the various entities of FIG. 5, as well as other figures associated with some of the disclosed embodiments, for the purposes of explanation, the nomenclature associated with a 3GPP LTE or LTE-A wireless network is used. However, it is to be appreciated that the system 500 can operate in other networks such as, but not limited to, an OFDMA wireless network, a CDMA network, a 3GPP2 CDMA2000 network and the like.

In multi-carrier operations, the downlink control information (DCI) messages associated with different UEs 515 can be carried on a plurality of component carriers. For example, the DCI on a PDCCH can be included on the same component carrier that is configured to be used by a UE 515 for PDSCH transmissions (i.e., same-carrier signaling). Alternatively, or additionally, the DCI may be carried on a component carrier different from the target component carrier used for PDSCH transmissions (i.e., cross-carrier signaling). In some embodiments, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 515 may receive data from one eNodeB 505. However, users on a cell edge may experience high inter-cell interference which may limit the data rates. Multiflow allows UEs to receive data from two eNodeBs 505 simultaneously. Multiflow works by sending and receiving data from the two eNodeBs 505 in two totally separate streams when a UE 115 is in range of two cell towers in two adjacent cells at the same time. The UE 115 talks to two eNodeB 505 simultaneously when the device is on the edge of either eNodeBs' reach. By scheduling two independent data streams to the mobile device from two different eNodeBs at the same time, multiflow exploits uneven loading in HSPA networks. This helps improve the cell edge user experience while increasing network capacity. In one example, throughput data speeds for users at a cell edge may double. "Multiflow" is a feature of LTE/LTE-A that is similar to dual-carrier HSPA, however, there are differences. For example, dual-carrier HSPA doesn't allow for connectivity to multiple towers to connect simultaneously to a device.

Previously, LTE-A standardization, LTE component carriers 530 have been backward-compatible, which enabled a smooth transition to new releases. However, this feature caused the LTE component carriers 530 to continuously transmit common reference signals (CRS, also referred to as cell-specific reference signals) in every subframe across the bandwidth. Most cell site energy consumption is caused by the power amplifier, as the cell remains on even when only limited control signaling is being transmitted, causing the amplifier to continue to consume energy. CRS were introduced in release 8 of LTE and are LTE's most basic downlink reference signal. The CRSs are transmitted in every resource block in the frequency domain and in every downlink subframe. CRS in a cell can be for one, two, or four corresponding antenna ports. CRS may be used by remote terminals to estimate channels for coherent demodulation. A New Carrier Type (NCT) allows temporarily switching off of cells by removing transmission of CRS in four out of five sub frames. This feature reduces power consumed by the power amplifier, as well as the overhead and interference from CRS, as the CRS is no longer continuously transmitted in every subframe across the bandwidth. In addition, the New Carrier Type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

Figure 6A:
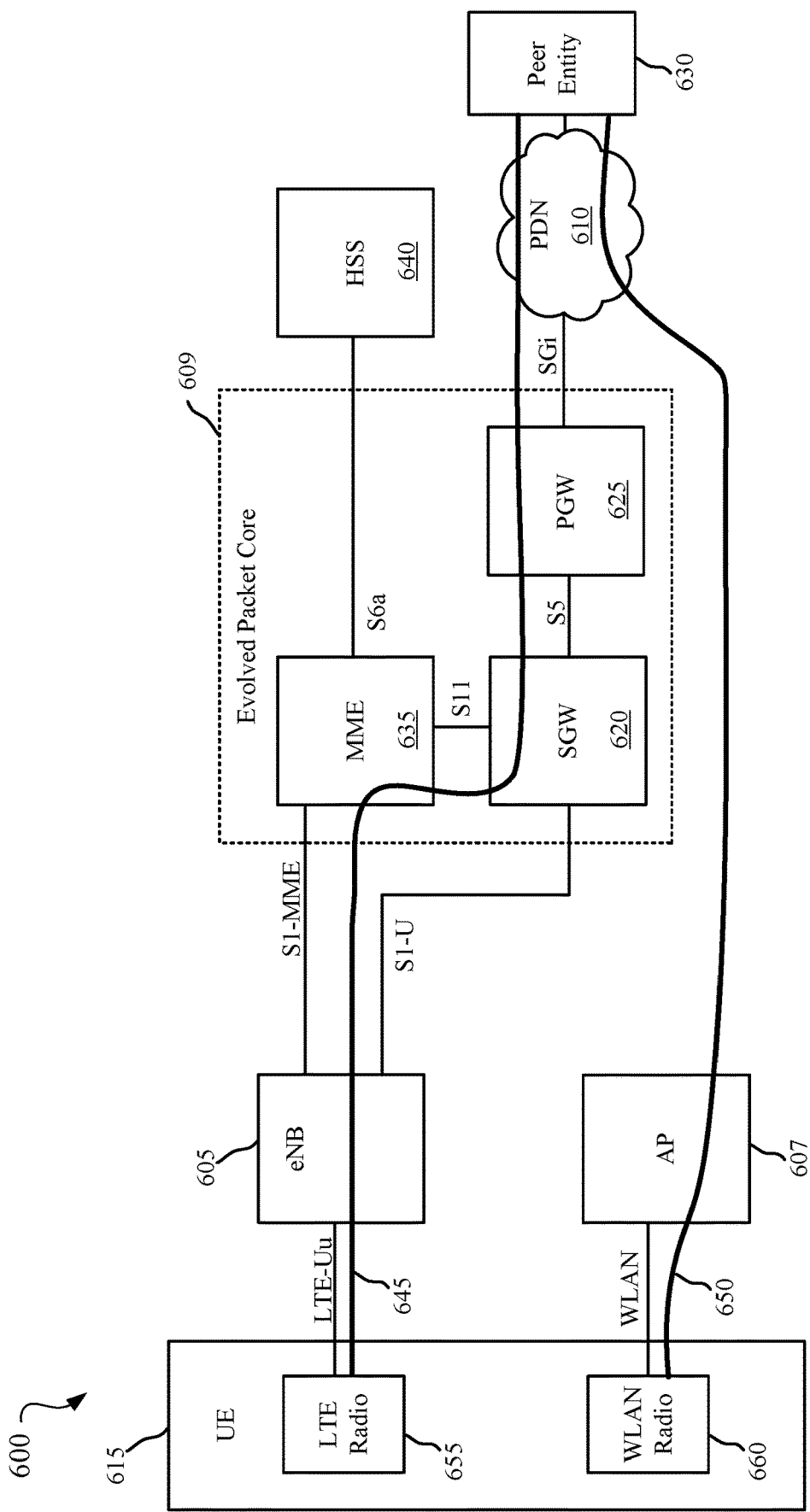
FIGS. 6A and 6B are block diagrams conceptually illustrating examples of data paths between a UE and a packet data network (PDN), in accordance with an aspect of the present disclosure.
Figure 6B:
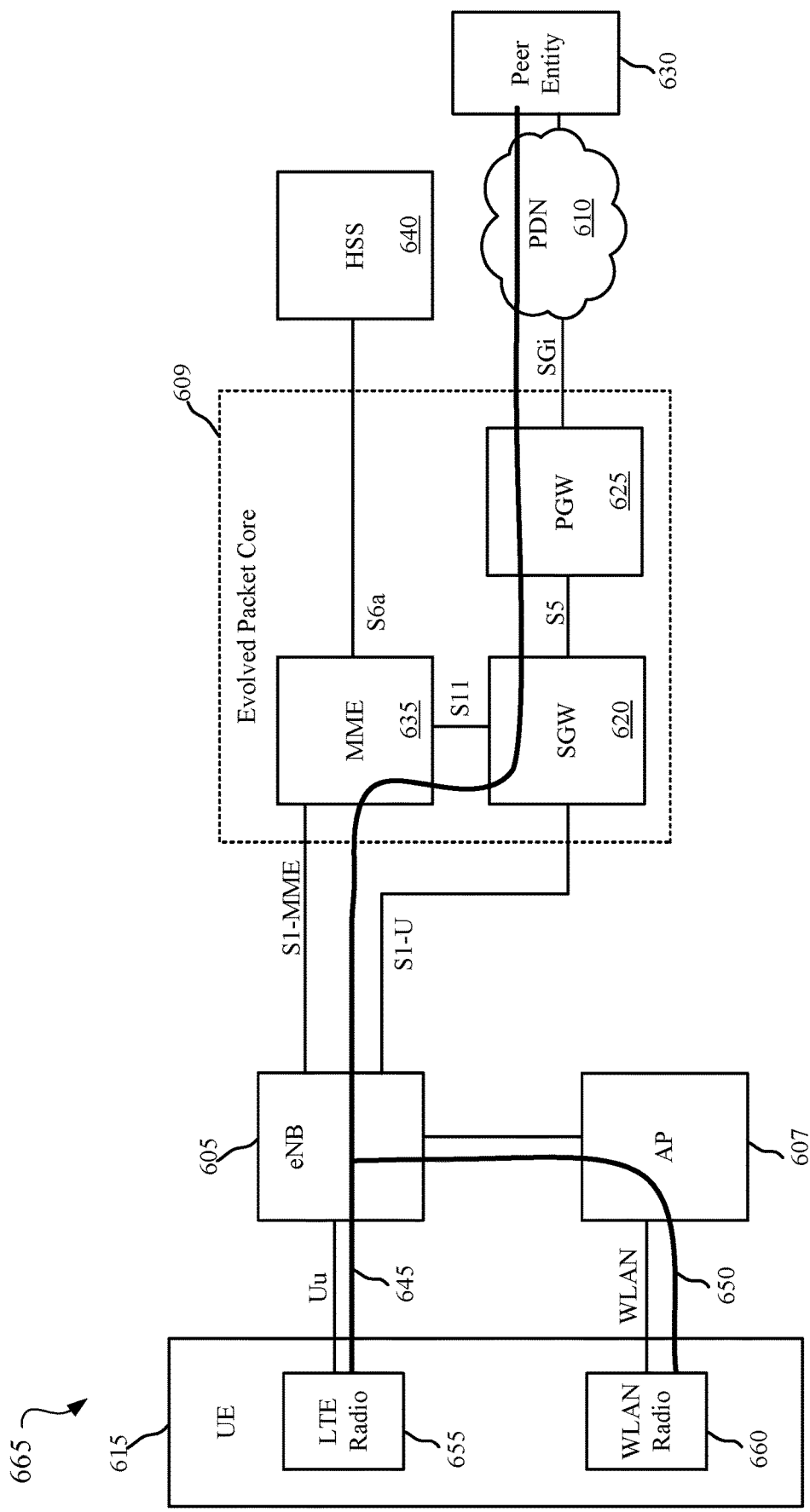

FIGS. 6A and 6B are block diagrams conceptually illustrating examples of data paths between a UE 615 and a peer entity 630 over a PDN 610 (e.g., the Internet), in accordance with an aspect of the present disclosure. The data paths include an LTE link path 645 and a WLAN link path 650 are shown within the context of a wireless communications system 600, 665 aggregating WLAN and LTE radio access technologies. In each example, the wireless communications system 600 and 665, shown in FIGS. 6A and 6B, respectively, may include a UE 615, an eNodeB 605, a WLAN access point 607, an evolved packet core (EPC) 609, a PDN 610, and a peer entity 630. The evolved packet core 609 of each example may include a mobility management entity (MME) 635, a serving gateway (SGW) 620, and a PDN gateway (PGW) 625. A home subscriber system (HSS) 640 may be communicatively coupled with the MME 635. The UE 615 of each example may include an LTE radio 655 and a WLAN radio 660. These elements may represent aspects of one or more of their counterparts described with reference to other Figures.

Referring specifically to FIG. 6A, the eNodeB 605 and WLAN access point 607 may be capable of providing the UE 615 with access to the PDN 610 using the aggregation of one or more LTE component carriers or one or more WLAN component carriers. Using this access to the PDN 610, the UE 615 may communicate with the peer entity 630. The eNodeB 605 may provide access to the PDN 610 through the evolved packet core 609 (e.g., through the LTE link path 645), and the WLAN access point 607 may provide direct access to the PDN 610 (e.g., through the WLAN link path 650).

The MME 635 may be the control node that processes the signaling between the UE 615 and the evolved packet core 609. Generally, the MME 635 may provide bearer and connection management. The MME 635 may, therefore, be responsible for idle mode UE tracking and paging, bearer activation and deactivation, and SGW selection for the UE 615. The MME 635 may communicate with the eNodeB 605 over an S1-MME interface. The MME 635 may additionally authenticate the UE 615 and implement Non-Access Stratum (NAS) signaling with the UE 615.

The HSS 640 may, among other functions, store subscriber data, manage roaming restrictions, manage accessible access point names (APNs) for a subscriber, and associate subscribers with MMES 635. The HSS 640 may communicate with the MME 635 over an S6a interface defined by the Evolved Packet System (EPS) architecture standardized by the 3GPP organization.

All user IP packets transmitted over LTE may be transferred through eNodeB 605 to the serving gateway 620, which may be connected to the PDN gateway 625 over an S5 signaling interface and the MME 635 over an S11 signaling interface. The serving gateway 620 may reside in the user plane and act as a mobility anchor for inter-eNodeB handovers and handovers between different access technologies. The PDN gateway 625 may provide UE IP address allocation as well as other functions.

The PDN gateway 625 may provide connectivity to one or more external packet data networks, such as PDN 610, over an SGi signaling interface. The PDN 610 may include the Internet, an Intranet, an IP Multimedia Subsystem (IMS), a Packet-Switched (PS) Streaming Service (PSS), and/or other types of PDNs.

In the present example, user plane data between the UE 615 and the evolved packet core 609 may traverse the same set of one or more EPS bearers, irrespective of whether the traffic flows over the LTE link path 645 or the WLAN link path 650. Signaling or control plane data related to the set of one or more EPS bearers may be transmitted between the LTE radio 655 of the UE 615 and the MME 635 of the evolved packet core 609, by way of the eNodeB 605.

FIG. 6B illustrates an example wireless communications system 665 in which the eNodeB 605 and WLAN access point 607 are collocated or otherwise in high-speed communication with each other. In this example, EPS bearer-related data between the UE 615 and the WLAN access point 607 may be routed to the eNodeB 605, and then to the evolved packet core 609. In this way, all EPS bearer-related data may be forwarded along the same path between the eNodeB 605, the evolved packet core 609, the PDN 610, and the peer entity 630.

Figure 7A:
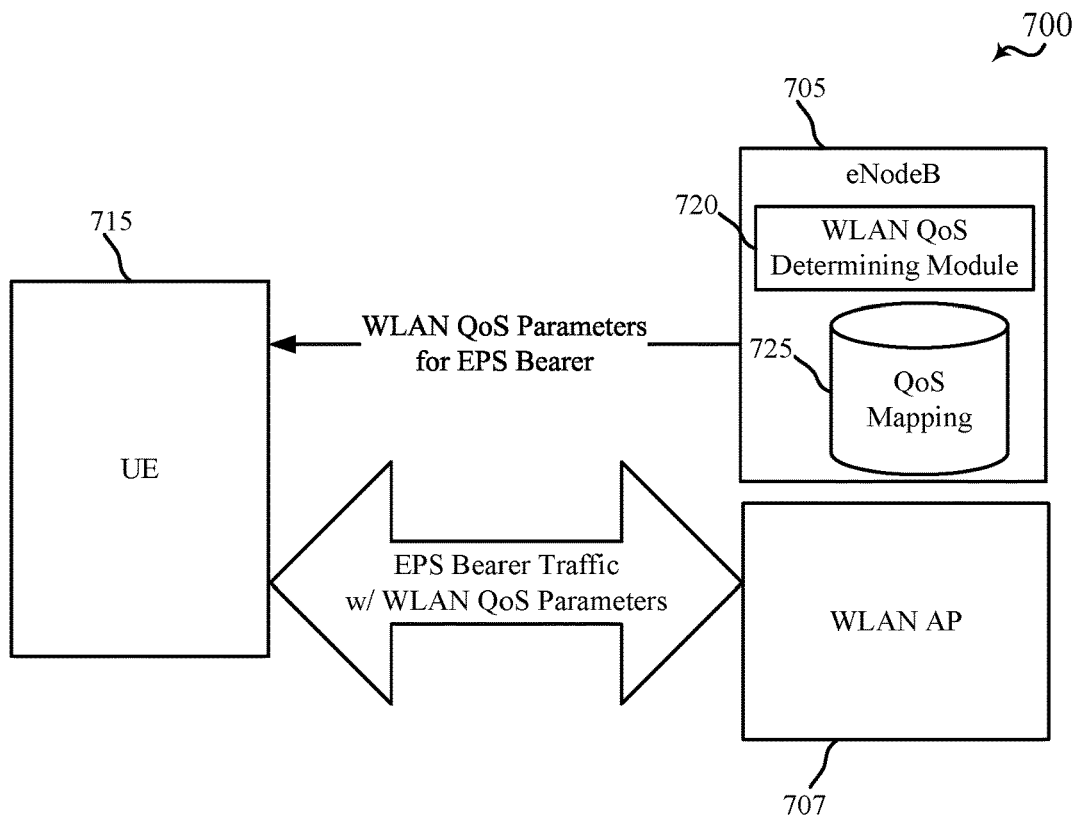
FIGS. 7A and 7B are block diagrams conceptually illustrating examples of QoS implementation, in accordance with an aspect of the present disclosure.
Figure 7B:
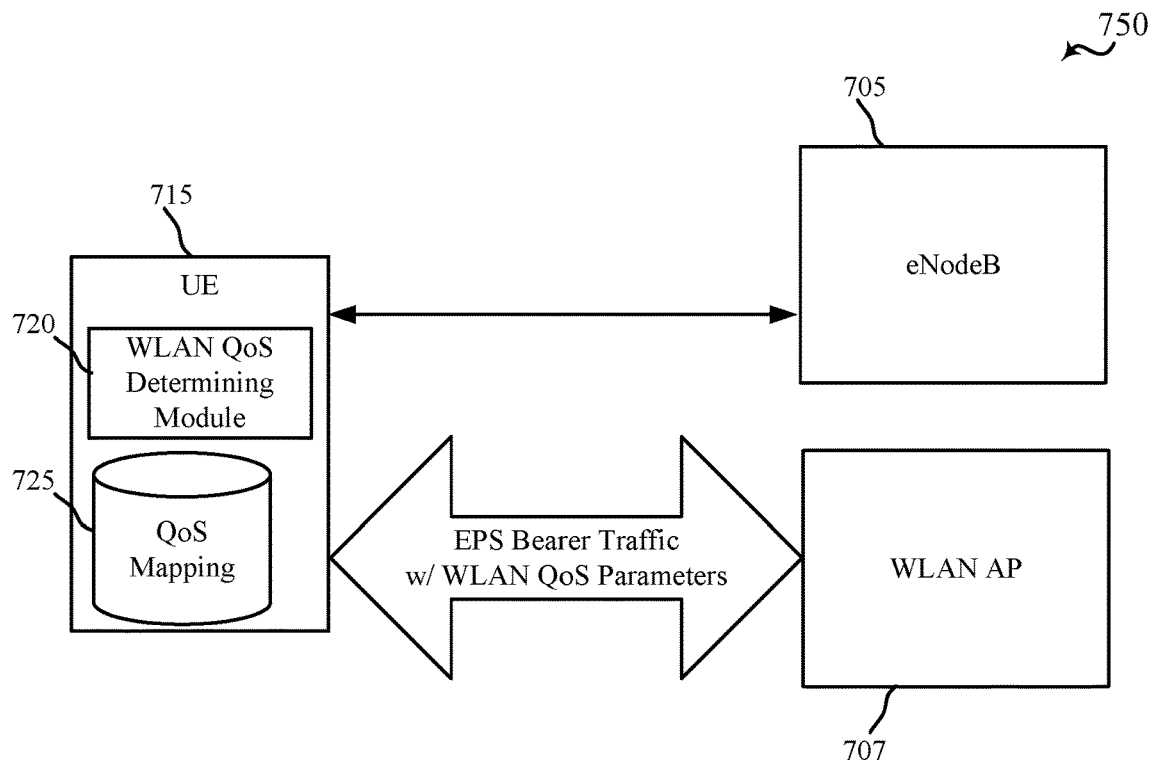

FIGS. 7A and 7B are block diagrams conceptually illustrating examples of QoS implementation, in accordance with an aspect of the present disclosure. The QoS implementation is described within the context of wireless communications systems 700, 750 for managing WLAN QoS for bearer traffic. Each wireless communications system 700, 750 includes a UE 715, an eNodeB 705, and a WLAN access point 707. The wireless communications systems 700, 750 may implement one or more aspects described with reference to the systems and devices of other Figures.

The UE 715 of FIGS. 7A and 7B may be configured to transmit and receive bearer traffic over an LTE air interface with eNodeB 705. The bearer traffic may relate to, for example, an EPS bearer. In addition, it may be permissible to transmit and receive data for certain EPS bearers over a WLAN interface between the UE 715 and the WLAN access point 707. To satisfy the QoS specifications of a bearer that is partially or entirely handled by the WLAN interface between the UE 715 and the WLAN access point 707, a first set of one or more QoS parameters associated with serving the bearer over the LTE air interface may be mapped to a second set of one or more QoS parameters associated with serving the bearer over the WLAN access point 707.

In the example of FIG. 7A, this mapping may occur at the eNodeB 705. The mapping may take place when traffic related to one or more bearers of the eNodeB 705 is offloaded from the eNodeB 705 to the WLAN access point 707. A WLAN QoS determining module 720 of the eNodeB 705 may identify a set of WWAN QoS parameters associated with the bearer for which partial or entire WLAN steering is possible and permissible. The WWAN QoS parameters may be represented by, for example, a QCI assigned to the bearer at the core network (i.e., the evolved packet core) when the bearer is set up or modified. The WLAN QoS determining module 720 may determine, based on QoS mapping data 725, a mapping between the WWAN QoS parameters of the bearer and a set of WLAN QoS parameters that provide an equal or better QoS than what is defined by the WWAN QoS parameters. In certain examples, the WLAN QoS parameters may include an access category (AC) or priority code point (PCP). In certain examples, the QoS mapping data 810 may include a table of static or semi-static mappings defined by a standard or specific to an implementation of the principles described herein. Additionally or alternatively, the eNodeB 705 may dynamically and/or periodically determine or receive the mapping data or the set of WLAN QoS parameters from another device in or associated with the core network.

The eNodeB 705 may signal the WLAN QoS parameters for the bearer to the UE 715. The UE 715 may then use the WLAN QoS parameters to transmit traffic of the bearer to the WLAN access point 707. In certain examples, the UE 715 may signal an indication of the WLAN QoS parameters selected for the bearer traffic to the WLAN access point 707. For example, where the WLAN QoS parameters are defined by an access category, the UE 715 may indicate the access category to the WLAN access point 707 using an priority field in one or more MAC headers (e.g., using an IEEE 802.1q header). Additionally or alternatively, the UE 715 may indicate the access category to the WLAN access point 707 in a Type of Service (ToS) field of an IP packet header.

In the example of FIG. 7B, the mapping of WWAN QoS parameters for the EPS bearer to WLAN QoS parameters for the EPS bearer may occur at the UE 715. A WLAN QoS determining module 720 of the UE 715 may identify a set of WWAN QoS parameters associated with the EPS bearer for which partial or entire WLAN steering is possible and permissible. The WWAN QoS parameters may be represented by, for example, a QCI assigned to the EPS bearer at the core network (i.e., the evolved packet core) when the EPS bearer is set up or modified. The WLAN QoS determining module 720 may determine, based on QoS mapping data 725, a mapping between the WWAN QoS parameters of the EPS bearer and a set of WLAN QoS parameters that provide an equal or better QoS than what is defined by the WWAN QoS parameters.

In certain examples, the WLAN QoS parameters may include an access category (AC) or priority code point (PCP) to be assigned to traffic of the EPS bearer. In certain examples, the QoS mapping data 725 may include a table of static or semi-static mappings defined by a standard or based on another implementation of the principles described herein. In certain examples, the QoS mapping data 725 at the UE 715 may be configured by an Open Mobile Alliance (OMA) server using an OMA Device Management (DM) message. Additionally or alternatively, the QoS mapping data 725 at the UE 715 may be configured using a universal subscriber module (USIM) or other device.

FIGS. 8A-8C are block diagrams conceptually illustrating examples of predetermined associations between WWAN and WLAN QoS parameters, in accordance with an aspect of the present disclosure. Specifically, FIGS. 8A-8C show diagrams of example tables of QoS mapping data 810, 815, 820 (corresponding to FIG. 8A, FIG. 8B, and FIG. 8C, respectively) that may be stored at or received by a UE 115, eNodeB, or other device to map a first set of QoS parameters associated with serving an bearer over a WWAN with a second set of QoS parameters associated with transmitting the bearer over WLAN. The QoS mapping data 810, 815, 820 may be static or semi-static, as described elsewhere in this specification. The QoS mapping data 810, 815, 820 may be examples of the QoS mapping data 725 described with reference to FIGS. 7A and 7B, and may be used by a UE 715 or an eNodeB 705 to determine a mapping of WWAN QoS parameters to WLAN QoS parameters for use when bearer traffic is offloaded from WWAN to WLAN. In the present example, the first set of QoS parameters may be represented by the QCI of the EPS bearer in question, as defined by 3GPP TS 23.203 and similar standards. The second set of QoS parameters in this example may be represented by a WLAN access category (AC) and/or a priority code point (PCP), as defined by the IEEE 802.11 family of standards. In additional or alternative examples, the first set of QoS parameters may include one or more of: an access class (not to be confused with access category) priority, a logical channel priority, a traffic class, or a traffic handling priority. Additionally or alternatively, the second set of QoS parameters may include one or more of: a maximum buffer size, a bit rate, or a packet latency.

FIG. 8A shows a table of QoS mapping data 810 associating each possible QCI of an EPS bearer with WLAN AC that supports the QoS requirements of that QCI. As discussed earlier, QoS support for EPS bearers in LTE and other 3GPP WWANs is based on the QCI determined by the MME when the EPS bearer is established. LTE Release 10 defines nine possible QCI classes, each of which is associated with a different set of QoS requirements for packet latencies, packet error loss rates, priority, and guaranteed bit rate. WLAN, on the other hand, defines levels of QoS support known as access categories (ACs). WLAN supports the different ACs by defining a shorter contention window and shorter arbitration inter-frame space for higher priority packets. For WLANs implementing the IEEE 802.11 standard, four basic ACs are possible: Background (AC_BK), Best Effort (AC_BE), Video (AC_VI), and Voice (AC_VO).

In the example of FIG. 8A, each possible QCI is mapped to a corresponding WLAN AC. Thus, when the QCI of an EPS bearer is known, the WLAN AC to associate with traffic for that EPS bearer may be derived from the QoS mapping data 810.

Additionally or alternatively, the QoS mapping data 810 may associate each possible logical channel priority or other QoS parameter(s) configured for a radio bearer serving the EPS bearer (e.g., see FIG. 2) with a WLAN AC to determine the WLAN QoS for serving the packets of the EPS bearer over WLAN.

The QoS mapping data 810 may be determined as a function of an individual WWAN or class of WWANs, an individual WLAN or class of WLANs, or combinations thereof. The QoS parameters for the WWAN and/or the WLAN may conform to standardized formats (e.g., 3GPP LTE, IEEE 802.11) or be proprietary to an individual operator or manufacturer. In certain examples, the QoS mapping data 810 may be separately configured for different WWAN-WLAN pairs. For example, the same QCI or radio bearer QoS parameter of one WWAN may map to different ACs in different WLANs. Conversely, the same AC of a WLAN may map to different QCIs or radio bearer QoS parameters for different WWANs. Thus, different QoS mapping data 810 may be stored by or provided to the UE for different WWAN-WLAN pairs.

In certain examples, the UE or the network may adjust the QoS mapping data 810 for a WWAN-WLAN pair over time according to changing network conditions, explicit signaling from the network, or other factors. For example, FIG. 8A shows a mapping of QCI 3 of the WWAN to access category AC_VO of the WLAN. However, the UE may adjust the mapping of QCI 3 to AC_BE if the UE determines that the WLAN is congested (e.g., by detecting a threshold amount of collisions, detecting interference on the channel, etc.), or in response to signaling received from the WWAN or WLAN. This dynamic adjustment in the QoS mapping data 810 may alter the contention window associated with bearers having a QCI of 3, thereby improving traffic flow.

FIG. 8B shows a table of QoS mapping data 815 associating WLAN PCPs, defined in IEEE 802.11q with WLAN ACs, defined in IEEE 802.11e. In certain examples, an IEEE 802.1q MAC header may be used to determine the WLAN QoS parameters of a packet to the WLAN. However, the IEEE 802.1q header may define the QoS parameters of the packet in terms of priority code point (PCP) rather than AC. The mapping of WLAN PCPs to WLAN ACs may be static, as shown in FIG. 8B.

FIG. 8C shows a table of QoS mapping data 820 which combines the tables of FIGS. 7A and 7B into a single table mapping EPS bearer QCIs of WWAN to WLAN PCPs and WLAN ACs. The QCI to PCP mapping shown in the QoS mapping data 820 of the present example may define the PCP values associated with the closest class of service priority level to the equivalent QCI.

Figure 9:
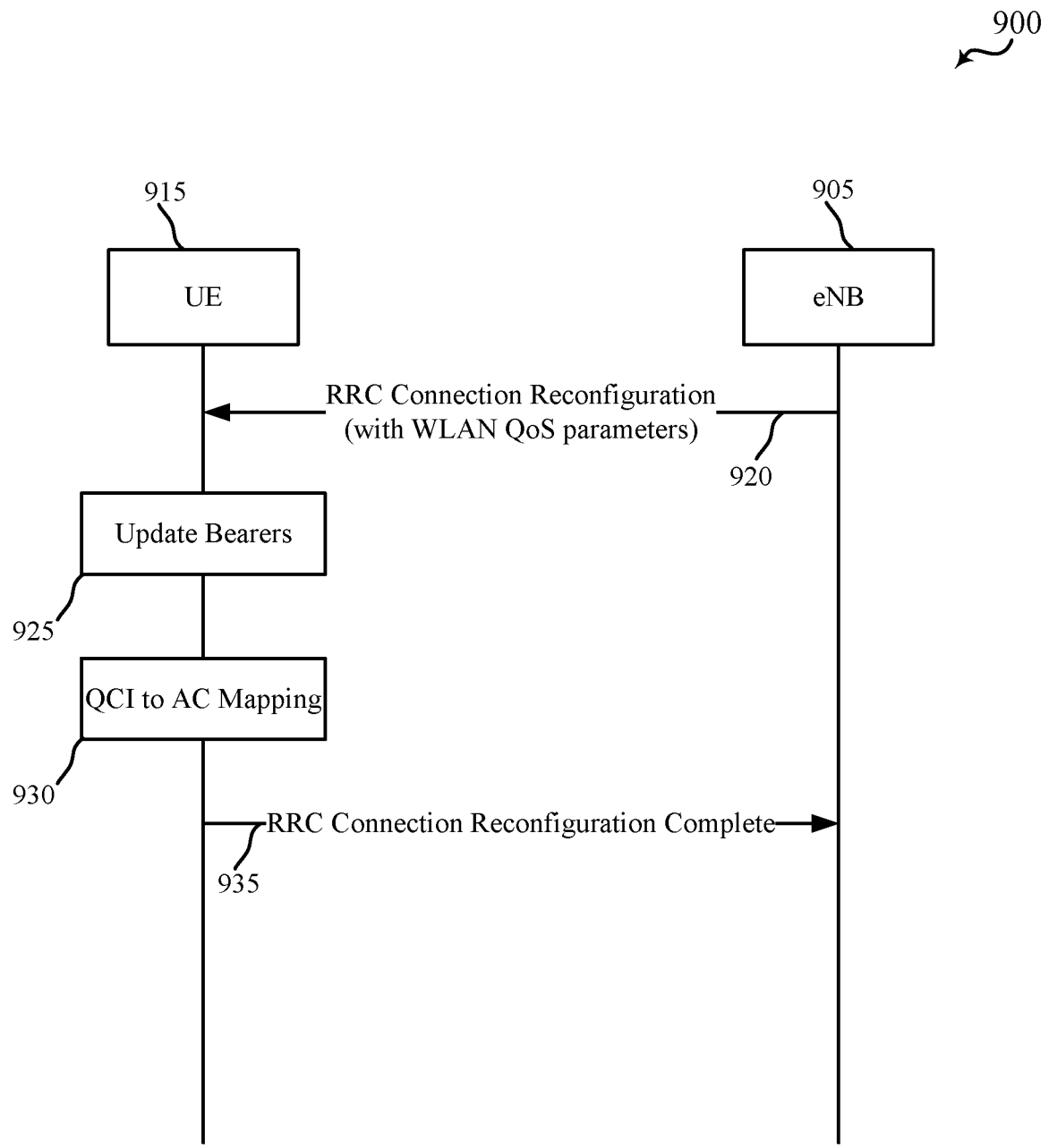
FIG. 9 is a block diagram conceptually illustrating an example of communications between an eNodeB and a UE, in accordance with an aspect of the present disclosure.

FIG. 9 is a block diagram conceptually illustrating an example of communications between an eNodeB 905 and a UE 915, in accordance with an aspect of the present disclosure. In particular, FIG. 9 illustrates a process 900 for setting up a radio bearer at a UE. The radio bearer may be used to serve an EPS bearer. The process 900 may include mapping a first set of one or more QoS parameters for serving the EPS bearer over a WWAN to a second set of one or more QoS parameters for serving the EPS bearer over a WLAN. This mapping may occur to accommodate the offloading of bearer traffic from the WWAN to the WLAN (e.g., in load management scenarios). In cases where a radio resource control (RRC) layer is managing whether bearer traffic is sent over WLAN or WWAN, or even when the actual bearer selection management is not handled by RRC, signaling may be used to define the mapping between the WWAN QoS parameters and the WLAN QoS parameters for the bearer.

In the example of FIG. 9, an RRC WWAN interworking radio bearer configuration procedure may be defined in connection with the transmission of an RRC Connection Reconfiguration message 920 (e.g., as defined in LTE) from the eNodeB 905 to the UE 915. For example, the RRC Connection Reconfiguration message 920 may instruct the UE 915 to set up or modify radio bearers for serving EPS bearer data. The RRC Connection Reconfiguration message 920 may be adapted to enable the eNodeB 905 to configure the radio bearers of the UE 915 to be served as either WWAN (e.g., LTE network) only, WLAN only, or RLC aggregation of WWAN and WLAN. The RRC Connection Reconfiguration message 920 may be further adapted to provide a mapping of the WWAN QoS parameter(s) (e.g., a logical channel priority associated with the QCI of the EPS bearer) of the radio bearer to a WLAN AC class or other type of WLAN QoS parameter(s). Because each EPS bearer may be correlated one-to-one with a radio bearer of the UE 915, by mapping the radio bearer to a WLAN AC class the eNodeB 905 may also map an associated EPS bearer to that WLAN AC class.

As shown in FIG. 9, the eNodeB 905 may transmit the RRC Connection Reconfiguration message 920 to the UE 915 over an air interface. Once the RRC connection reconfiguration has taken place at the UE 915, the UE 915 may update 925 its bearers, perform 930 QCI to AC mapping in accordance with the received mapping data, and transmit a RRC Connection Reconfiguration Complete message 935 to the eNodeB 905 to indicate that reconfiguration of the bearers is complete.

Figure 10:
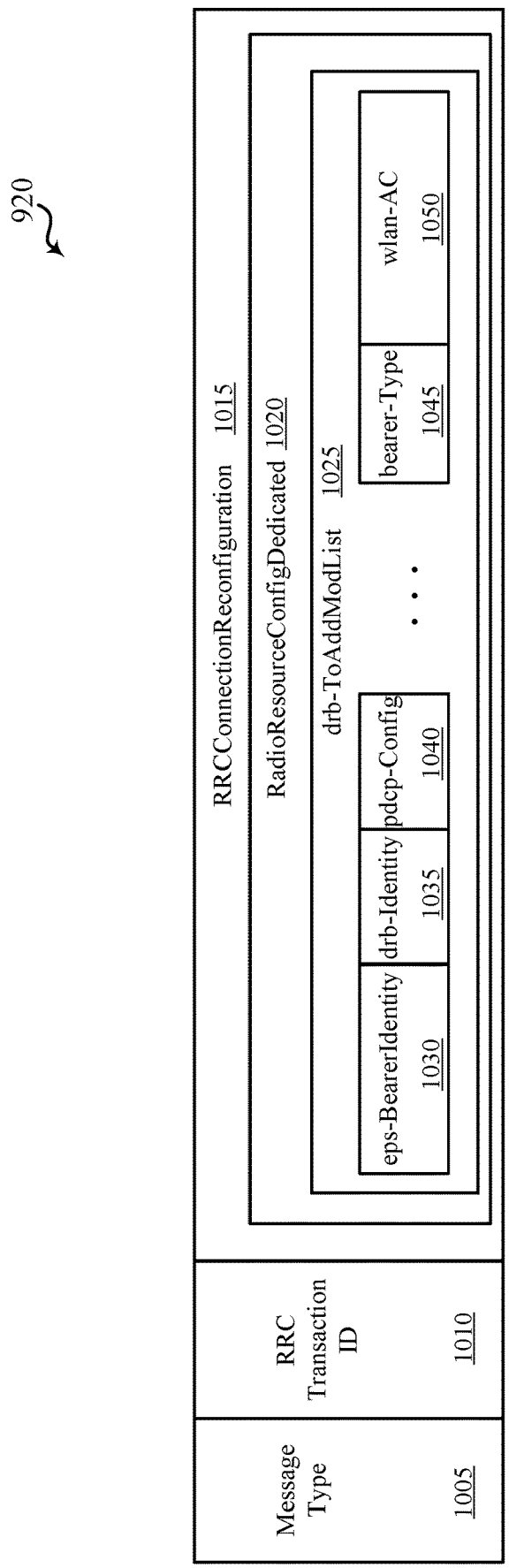
FIG. 10 is a block diagram conceptually illustrating an example of an RRC message transmitted from an eNodeB to a UE, in accordance with an aspect of the present disclosure.

FIG. 10 is a block diagram conceptually illustrating an example of an RRC message transmitted from an eNodeB to a UE, in accordance with an aspect of the present disclosure. In particular, FIG. 10 shows one example of the format of an RRC Connection Reconfiguration message 920 adapted to convey RRC WWAN interworking radio bearer configuration to the UE 915. The RRC Connection Reconfiguration Message 920 may include a message type field 1005 identifying the message as a RRC Connection Reconfiguration message, an RRC transaction ID field 1010, and a RRC Connection Reconfiguration field 1015.

The RRC Connection Reconfiguration field 1015 may include a number of optional information elements, including a measConfig information element, a mobilityControlInfo information element, a dedicatedInfoNASList, a radioResourceConfigDedicated information element, a securityConfigHO information element, a nonCriticalExtension information element, a lateNonCriticalExtension information element, a nonCriticalExtension information element, an otherConfig information element, a fullConfig information element, and/or other information elements.

For the sake of clarity of illustration, the RRC Connection Reconfiguration Message 920 is shown with only a RadioResourceConfigDedicated information element 1020. The RadioResourceConfigDedicated information element 1020 may include a number of information elements related to configuring a radio bearer at the UE 915. The radio bearer may serve an EPS bearer. When configuring a radio bearer to serve an EPS bearer as a data radio bearer (DRB), the RadioResourceConfigDedicated information element 1020 may include a drb-ToAddModList information element 1025 containing information about the DRB configuration.

The drb-ToAddModList information element 1025 may include, for example, an eps-BearerIdentity information element 1030 to identify the EPS bearer that the radio bearer is serving, a drb-Identity information element 1035 identifying and labeling the radio bearer, a pdcp-Config information element 1040 containing Packet Data Convergence Protocol (PDCP) information, an rlc-Config information element (not shown) containing RLC information for the radio bearer, a logicalChannelIdentity information element containing an identity of the logical channel associated with the radio bearer, and a logicalChannelConfig information element containing logical channel configuration information.

In additional to the above described parameters, the drb-ToAddModList information element 1025 of FIG. 10 may include, for each data radio bearer being set up, a bearer-Type information element 1045 and a wlan-AC information element 1050 that define the interworking between WWAN (e.g., LTE communication network) and WLAN access networks for the newly configured radio bearer or modifying existing radio bearer. Specifically, the bearer-Type information element 1045 may be an optional information element that is present when the bearer is capable of being transmitted over both WWAN and WLAN. The bearer-Type information element 1045 may select an enumerated option indicating whether traffic for the corresponding radio bearer is to be transmitted over WWAN only, WLAN only, or if the bearer traffic can be served over an aggregation of both LTE and WLAN.

If the bearer-type information element 1045 indicates the WLAN only or WWAN-WLAN split routing of the radio bearer, the wlan-AC information element 1050 may provide a WLAN AC to be associated with the radio bearer when the radio bearer is switched between WWAN and WLAN to maintain a level of QoS. Thus, the wlan-AC information element 1050 may specify one of AC_BK, AC_BE, AC_VI, or AC_VO that may be associated with a QCI of WWAN radio bearer according to the principles described elsewhere in this specification. Additionally or alternatively, the wlan-AC may specify a PCP or other WLAN QoS parameter that may be associated with a QCI of WWAN radio bearer to use for the bearer.

Returning to the example of FIG. 9, upon receiving the RRC Connection Reconfiguration message 920 from the eNodeB 905, the UE 915 may perform the procedures defined in 3GPP TS 36.331 to set up the dedicated radio bearer. In addition, the UE 915 may identify each drb-Identity value included in the drb-ToAddModList information element 1025 that is not a part of the current UE configuration. For any drb-Identity values not part of the current UE configuration, the UE 915 may determine whether the drb-ToAddModList information element 1025 includes the bearer-Type information element 1045 described with reference to FIG. 10. If the bearer-Type information element 1045 is present, the UE 915 may set the routing of the newly established bearer to WWAN only, WLAN only, or a split of WWAN and WLAN according to the contents of the bearer-Type information element 1045. If the bearer-Type information element 1045 is set to WLAN only or to a split between WWAN and WLAN, the UE 915 may set the WLAN AC to use for sending the data for that bearer over WLAN according to the wlan-AC information element 1050. If the bearer-Type information element 1045 is not present in the drb-ToAddModList information element 1025 or elsewhere in the RRC Connection Reconfiguration message 920, the UE 915 may set the routing of the newly established bearer to LTE only.

Additionally or alternatively, the UE 915 may identify one or more drb-Identity values in the drb-ToAddModList information element 1025 which are already a part of the current UE configuration. The drb-ToAddModList information element 1025 may specify parameters for reconfiguring the radio bearers associated with these known drb-Identity values. Thus, for each radio bearer represented in the drb-ToAddModList information element 1025 that is part of the current UE configuration, the UE 915 may reconfigure the routing of that radio bearer to LTE only, WLAN only, or a LTE-WLAN split in accordance with the bearer-Type information element 1045. In addition, for radio bearers reconfigured to route traffic over WLAN, the UE 915 may set the WLAN QoS parameters for transmitting traffic of that bearer over WLAN to the WLAN AC defined by the wlan-AC information element 1050.

Figure 11:
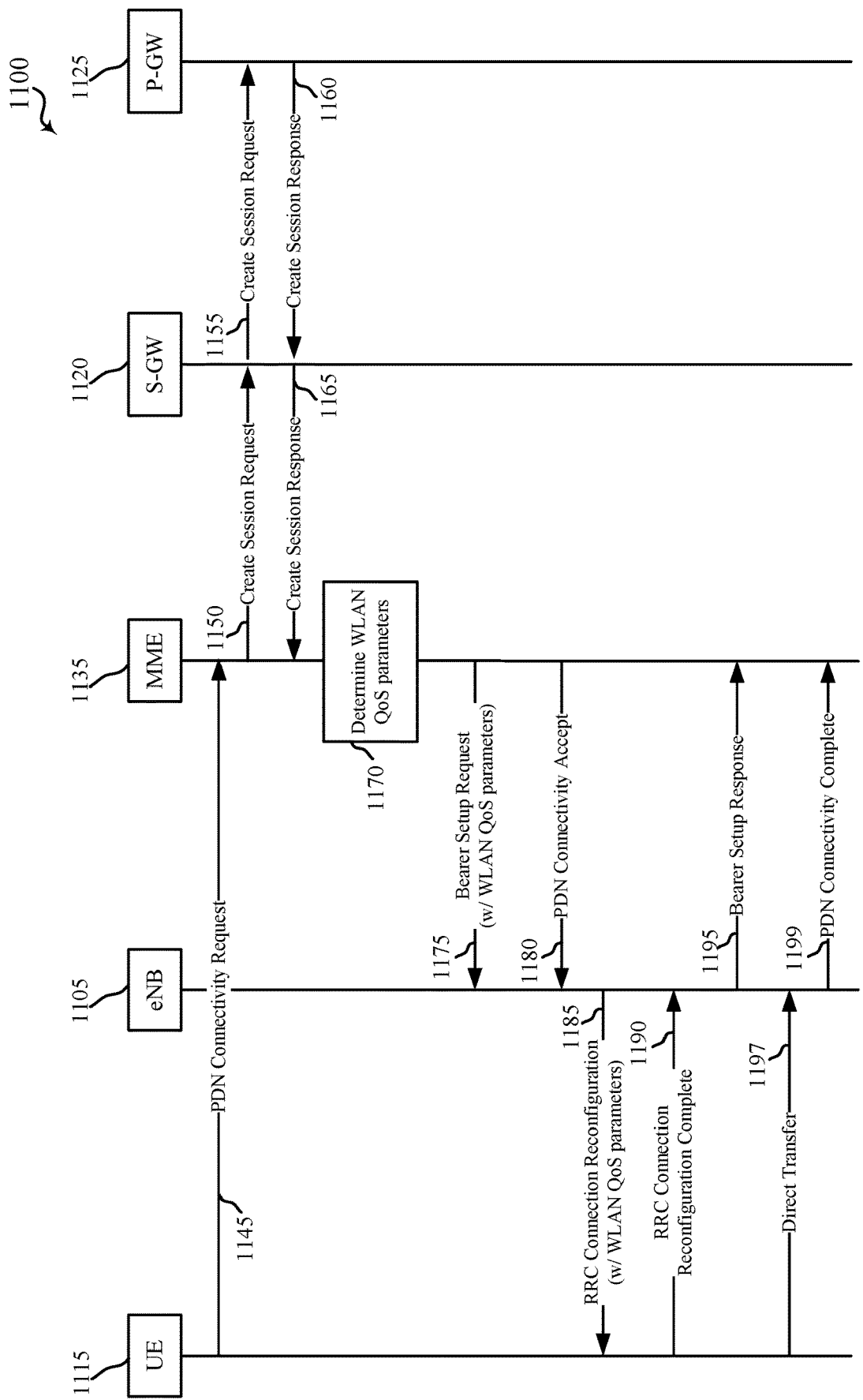
FIG. 11 is a block diagram conceptually illustrating an example of communications between nodes of a telecommunications system, in accordance with an aspect of the present disclosure.

FIG. 11 is a block diagram conceptually illustrating an example of communications between nodes of a telecommunications system, in accordance with an aspect of the present disclosure. In particular, FIG. 11 shows an example of a process 1100 for UE-requested PDN connectivity during which a set of one or more WLAN QoS parameters for an EPS bearer is established and mapped at a non-access stratum (NAS) layer. The process 1100 may allow a UE 1115 to utilize NAS signaling to request connectivity to a PDN over a default EPS bearer. In certain examples, the process 1100 may trigger one or more multiple dedicated bearer establishment procedures for the UE 1115.

The process 1100 may begin with the UE 1115 transmitting a NAS PDN connectivity request message 1145 to the MME 1135 via eNodeB 1105. The NAS PDN connectivity request message 1145 may optionally include a set of one or more requested WLAN QoS parameters for the new PDN connection. For example, the NAS PDN connectivity request message 1145 may indicate the WLAN AC or other WLAN QoS parameters associated with the PDN connection in an information element of the NAS PDN connectivity request message 1145. In one example, the UE 1115 may request an internet connection with a QCI of 6 for WWAN, determine that the QCI of 6 is mapped to AC-BE for WLAN, and include the requested AC-BE WLAN QoS parameters in the NAS PDN connectivity request message 1145.

The MME 1135 may allocate an EPS bearer ID to the requested PDN connection and send a create session request message 1150 to a serving gateway 1120. The create session request message 1150 may include information about the requested PDN connection, including the EPS bearer ID selected by the MME 1135. The serving gateway 1120 may create a new entry in its EPS bearer table, transmit a create session request message 1155 to a PDN gateway 1125 to establish the new connection at the PDN (not shown). The serving gateway 1120 may receive a create session response message 1160 from the PDN gateway 1125 indicating that the PDN connection has been established, and transmit a create session response message 1165 to the MME 1135.

Upon receiving the create session response message 1165, the MME 1135 may determine 1170 a set of WLAN QoS parameters for the new EPS bearer. For example, the MME 1135 may select a WLAN AC and/or PCP for the new EPS bearer based on characteristics of the new PDN connection to be serviced by the EPS bearer. In certain examples, the MME 1135 may select the WLAN QoS parameters based on the set of WLAN QoS parameters included in the NAS PDN connectivity request message 1145. In other examples, the MME 1135 may determine the WLAN QoS parameter(s) based on a static or semi-static mapping defined by a standard or implementation-specific feature. In still additional or alternative examples, the MME 1135 may determine the WLAN QoS parameters based on a communication from another device from within or outside of the evolved packet core. For example, a device outside of the evolved packet core may maintain a table mapping WWAN QoS parameters to WLAN QoS parameters and provide the mapping data to the MME 1135 as a service or update.

The MME 1135 may then transmit a bearer setup request message 1175 via an S1 interface or a PDN connectivity accept message 1180 via the NAS layer to an eNodeB 1105. The bearer setup request message 1175 and/or the PDN connectivity accept message 1180 may include one or more WWAN QoS parameters determined for the EPS bearer (e.g., a QCI) and the WLAN QoS parameters determined for the EPS bearer associated with the WWAN QoS parameters. The UE 1115 may additionally or alternatively receive the QCI over the NAS layer from the MIME. Alternatively, the MME 1135 may not provide the WLAN QoS parameters for the EPS bearer, and the eNodeB 1105 may determine the WLAN QoS parameters for the EPS bearer using an operations, administration, and management (OAM) service based on the QCI of the EPS bearer. For example, the eNodeB 1105 may utilize the WLAN QoS parameters received in the NAS PDN connectivity request message 1145 to determine WLAN QoS of the radio bearer for serving the EPS bearer.

Upon receiving the bearer setup request message 1175 and/or PDN connectivity accept 1180, the eNodeB 1105 may transmit an RRC Connection Reconfiguration message 1185 to the UE 1115 to set up the radio bearer serving the EPS bearer. The RRC Connection Reconfiguration message 1185 may include the WLAN QoS parameters selected for the EPS bearer which correspond to the radio bearer serving the EPS bearer. Following the setup of the radio bearer, the UE 1115 may transmit an RRC Connection Reconfiguration Complete message 1190 to the eNodeB 1105, which may in turn transmit a bearer setup response message 1195 to the MME 1135. The NAS layer of the UE may build a PDN connectivity complete message including the EPS bearer identity, then send the PDN connectivity complete message to the eNodeB as a direct transfer 1197 message. The eNodeB 1105 may forward the received PDN connectivity complete 1199 message to the MME 635.

It will be understood that the functionality of a UE 1115 indicating a requested set of WLAN QoS parameters for an EPS bearer may be performed using other types of NAS signaling. For example, the UE 1115 may request a set of WLAN QoS parameters for an EPS bearer using an attach request (e.g., indicating the requested WLAN QoS parameters in an ESM message container), a bearer resource allocation request message to activate a dedicated bearer (as opposed to the illustrated PDN connectivity request for activating a default bearer), or a modify bearer context request message. Similarly, the MME 1135 may set the WLAN QoS parameters for the EPS bearer using other types of NAS signaling. For example, the MME 1135 may set the WLAN AC or PDP for an EPS using an activate default EPS bearer context request message to activate the default bearer or a bearer resource modification request to modify a dedicated bearer.

In still other examples, a device other than the MME 1135 may perform the functionality of determining the WLAN QoS parameters for the EPS bearer. For example, during the process 1100 of FIG. 11, the serving gateway 1120 or PDN gateway 1125 may perform the functionality of determining 1170 the WLAN QoS parameters and transmit the determined WLAN QoS parameters in its respective create session response message 1160, 1165. In still other examples, a device such as a serving GPRS support node (SGSN) for non-LTE general packet radio service (GPRS) devices may also perform the functionality of determining 1170 the WLAN QoS parameters for EPS bearers implemented over non-LTE air interfaces. In such examples, the SGSN may transmit the WLAN QoS parameters over an Iu interface to a radio network controller or other GPRS entity for use by a mobile GPRS device in transmitting evolved packet core bearer related traffic over WLAN.

It will be further understood that while the present example is given in the context of an LTE system, similar processes may be performed in other systems to set up and map WLAN QoS parameters to an EPS bearer. For example, a UMTS system may utilize a PDP context activation procedure in a similar manner to map the WLAN QoS parameters to a new EPS bearer (e.g., the UE may signal a requested set of WLAN QoS parameters for the new PDP context using a PDP context activation message).

Figure 12:
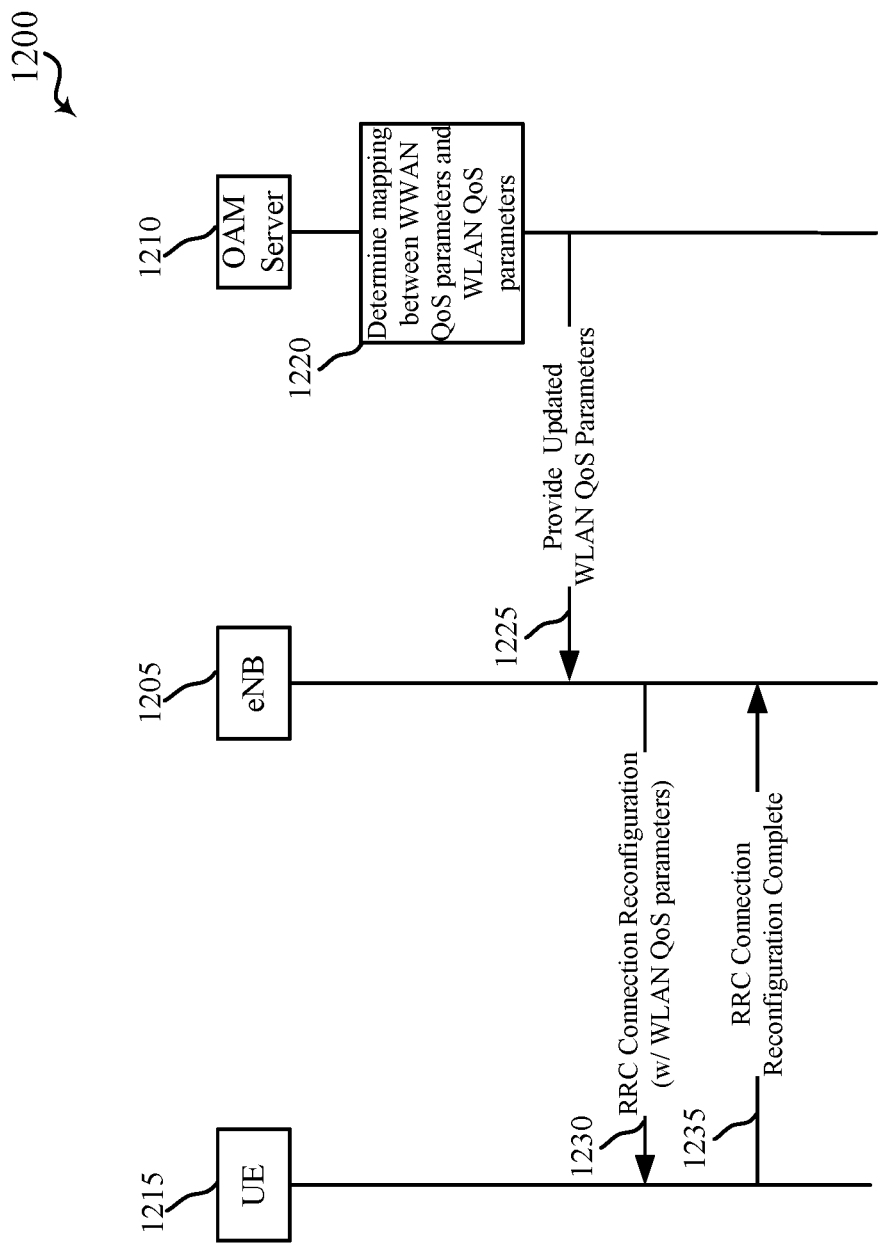
FIG. 12 is a block diagram conceptually illustrating an example of communications between nodes of a telecommunications system, in accordance with an aspect of the present disclosure.

FIG. 12 is a block diagram conceptually illustrating an example of communications between nodes of a telecommunications system, in accordance with an aspect of the present disclosure. Specifically, FIG. 12 illustrates a diagram of another example of a process 1200 for determining and signaling WLAN QoS parameters for a bearer. In the process 1200, an Operations, Administration, and Management (OAM) server 1210 may determine 1220 a mapping between WWAN QoS parameters (e.g., QCI) and WLAN parameters (e.g., AC, PCP) for evolved packet core bearers. The OAM server 1210 may provide 1225 the new/updated WLAN QoS to an eNodeB 1205. In certain examples, the OAM server 1210 may create and/or update a list or table stored or to be stored by the eNodeB 1205. The list or table may include mappings between WWAN QoS parameters and WLAN QoS parameters for evolved packet core bearers. The download may occur periodically (e.g., every 24 hours) or in response to a trigger (e.g., a change to the table is detected at the OAM server 1210). The eNodeB 1205 may then communicate with a UE 1215, using the downloaded WLAN QoS parameters to configure the WLAN QoS parameters of radio bearers supporting the evolved packet core bearers. This communication may include the exchange of RRC Connection Reconfiguration 1230 and RRC Connection Reconfiguration Complete messages 1235, or other RRC messages, consistent with the principles of FIGS. 9-10.

Figure 13:
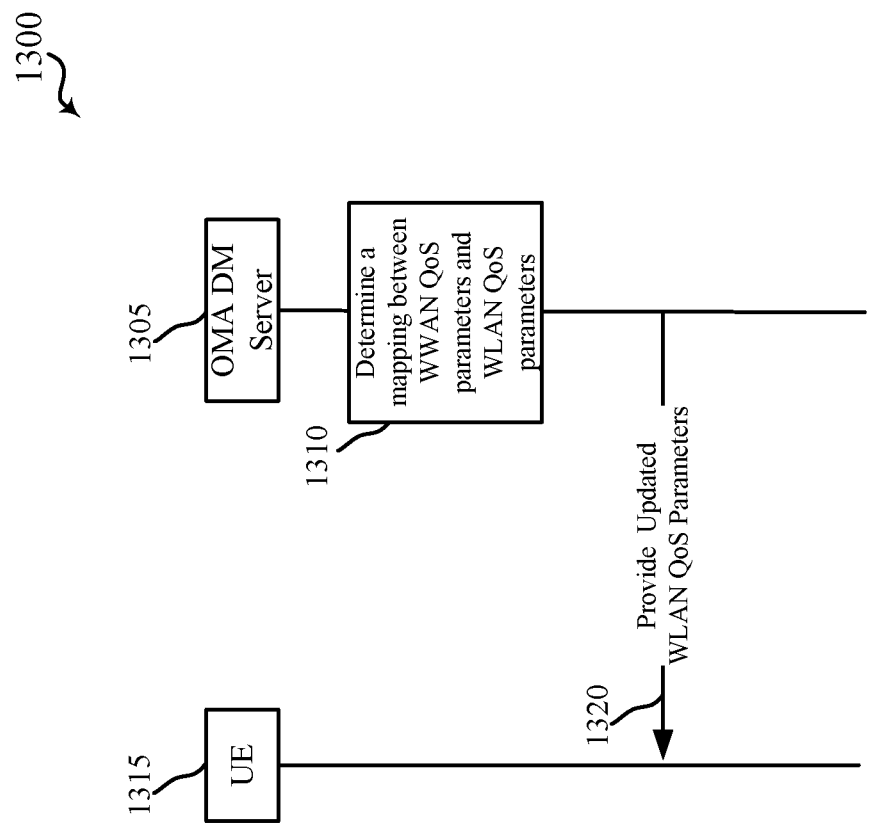
FIG. 13 is a block diagram conceptually illustrating an example of communications between nodes of a telecommunications system, in accordance with an aspect of the present disclosure.

FIG. 13 is a block diagram conceptually illustrating an example of communications between nodes of a telecommunications system, in accordance with an aspect of the present disclosure. Specifically, FIG. 13 illustrates a process 1300 for determining and signaling WLAN QoS parameters for a bearer. In the process 1300, an open mobile alliance device management (OMA DM) server 1305 may determine 1310 a mapping between WWAN QoS parameters (e.g., QCI) and WLAN parameters (e.g., AC, PCP) for bearers. The OMA DM server 1305 may provide 1320 the new or updated WLAN QoS parameters to a UE 1315-1. For example, the new or updated WLAN QoS parameters may be in the form of a newly created list or table for storage by the UE 1315. In certain examples, the OMA DM server 1305 may update a list or table stored by the UE 1315 of mappings between WWAN QoS parameters and WLAN QoS parameters for evolved packet core or radio bearers. The updated WLAN QoS parameters may be provided periodically (e.g., every 24 hours) or in response to a trigger (e.g., upon attaching to a new network). The UE 1315 may use the stored mapping data to determine and signal the WLAN QoS for bearer traffic transmitted by the UE 1315 over WLAN. In alternative embodiments, the UE 1315 may retrieve the stored mapping data from a universal subscriber identity module (USIM) or other device.

Figure 14:
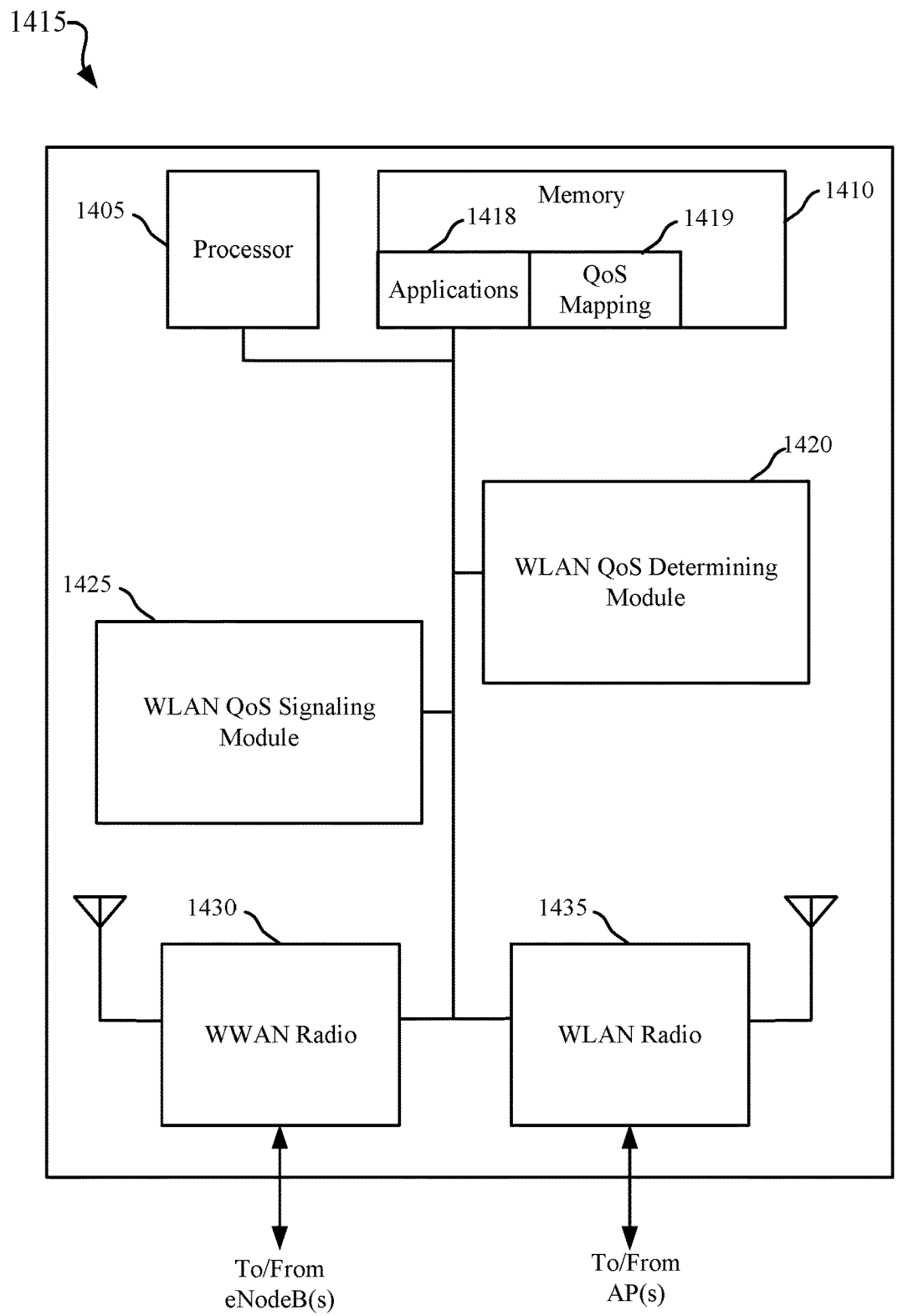
FIG. 14 is a block diagram conceptually illustrating an example of a UE, in accordance with an aspect of the present disclosure.

FIG. 14 is a block diagram conceptually illustrating an example of a UE 1415, in accordance with an aspect of the present disclosure. The UE 1415 may be an example of one or more of the UEs described with reference to other Figures. The UE 1415 may include a processor 1405, a memory 1410, a WLAN QoS determining module 1420, a WLAN QoS signaling module 1425, a WWAN radio 1430, and a WLAN radio 1435. Each of these components may be in communication, directly or indirectly.

The processor 1405 may be configured to execute code stored by memory 1410 to implement one or more aspects of the WLAN QoS determining module 1420, the WLAN QoS signaling module 1425, the WWAN radio 1430, or the WLAN radio 1435. The processor 1405 may also execute code stored by the memory 1410 to execute other applications 1418.

The WLAN QoS determining module 1420 may be configured to identify a first set of one or more QoS parameters (e.g., a QCI) for serving a bearer over a wireless wide area network (WWAN). The first set of one or more QoS parameters may be received from another device (e.g., from or by way of an eNodeB). The WLAN QoS determining module 1420 may be further configured to determine a second set of one or more QoS parameters for serving the bearer over a wireless local area network (WLAN) based on an association between the first set of QoS parameters and the second set of QoS parameters. The association between the first set of QoS parameters and the second set of QoS parameters may be stored locally in the memory 1410 as the QoS mapping 1419 shown in FIG. 14, and/or received from an external device as described with reference to the previous Figures. Alternatively, the QoS mapping 1419 may be stored in a USIM module (not shown) communicatively coupled with or integrated into the UE 1415. The WLAN QoS signaling module 1425 may be configured to receive the second set of QoS parameters from one or more external devices and/or signal the WLAN QoS parameters to a WLAN AP (as a PCP in an IEEE 802.11q header or an AC in an IP header).

The WWAN radio 1430 may be configured to communicate with WWAN base stations (e.g., one or more of the WWAN base stations and/or eNodeBs described in other Figures) over one or more carriers of a cellular WWAN (e.g., LTE/LTE-A, eHRPD, EV-DO, 1x/HRPD, etc.). The WLAN radio 1435 may be configured to communicate with WLAN access points (e.g., WLAN access points 107) over one or more carriers of a WLAN. As discussed above, the WWAN radio 1430 may transmit and receive data related to one or more bearers of the WWAN using a set of one or more WLAN QoS parameters. The set of WLAN QoS parameters may be mapped to one or more WWAN QoS parameters according to the QoS mapping 1419 stored in the memory 1410 and/or received from an external network device.

Figure 15:
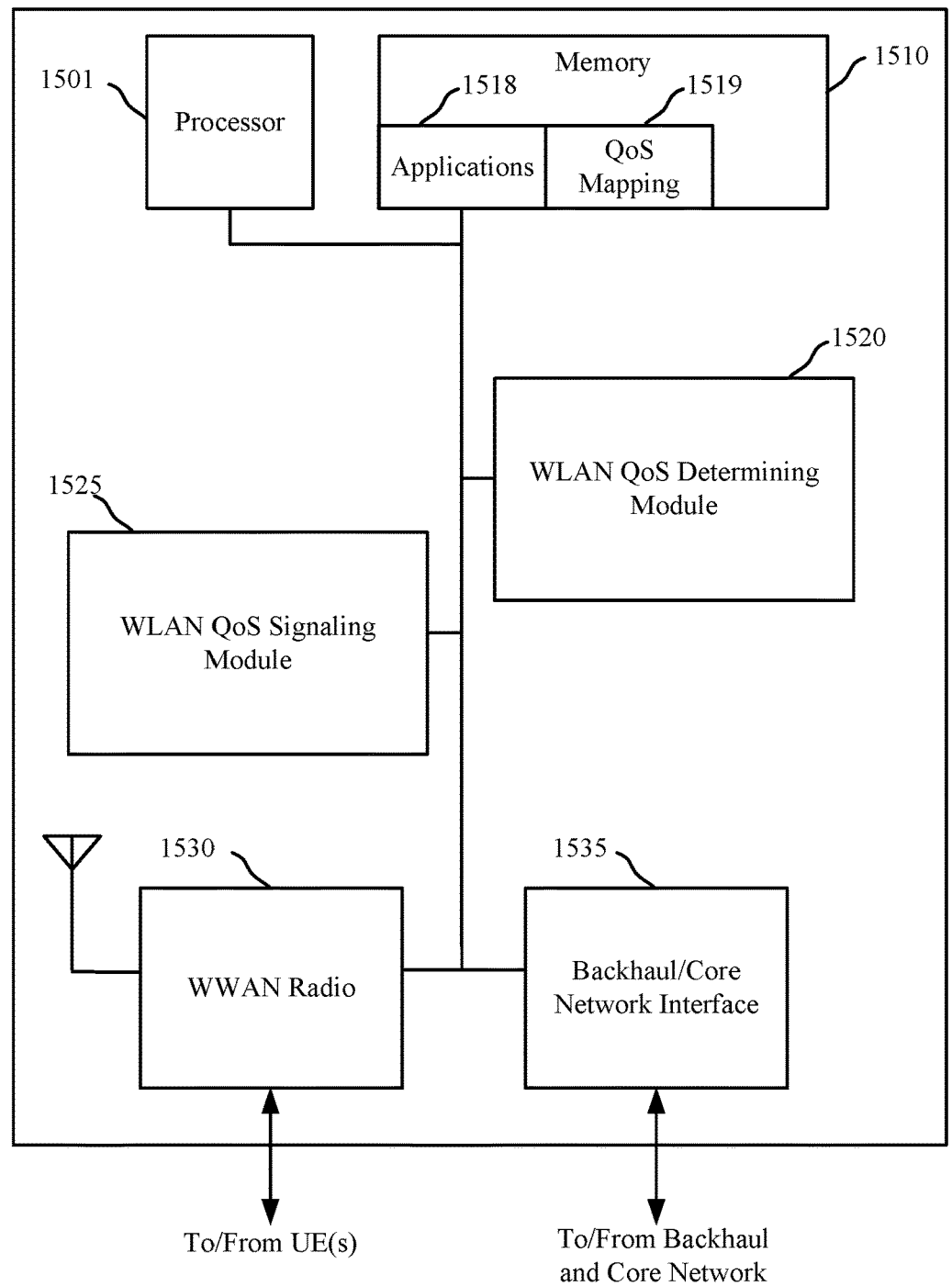
FIG. 15 is a block diagram conceptually illustrating an example of an eNodeB or other base station, in accordance with an aspect of the present disclosure.

FIG. 15 is a block diagram illustrating an example of an eNodeB 1505 or other base station, in accordance with an aspect of the present disclosure. The eNodeB 1505 may be an example of one or more of the eNodeBs and/or other WWAN base stations described with reference to other Figures. The eNodeB 1505 may include a processor 1501, a memory 1510, a WLAN QoS determining module 1520, a WLAN QoS signaling module 1525, a WWAN radio 1530, and a backhaul core network interface 1535. Each of these components may be in communication, directly or indirectly.

The processor 1501 may be configured to execute code stored by memory 1510 to implement one or more aspects of the WLAN QoS determining module 1520, the WLAN QoS signaling module 1525, the WWAN radio 1530, or the backhaul core network interface 1535. The processor 1501 may also execute code stored by the memory 1510 to execute other applications 1518.

The WLAN QoS determining module 1520 may be configured to identify a first set of one or more QoS parameters (e.g., a QCI) for serving a bearer over a wireless wide area network (WWAN). The first set of one or more QoS parameters may be received from another device (e.g., from or by way of a MME, a serving gateway, a UE, or another device). The WLAN QoS determining module 1520 may be further configured to determine a second set of one or more QoS parameters for serving the bearer over a wireless local area network (WLAN) based on an association between the first set of QoS parameters and the second set of QoS parameters. The association between the first set of QoS parameters and the second set of QoS parameters may be stored locally in the memory 1510 as the QoS mapping 1519 shown in FIG. 15, and/or received from an external device as described with reference to the other Figures. The WLAN QoS signaling module 1525 may be configured to receive the second set of QoS parameters from one or more external devices and/or signal the WLAN QoS parameters to a UE.

The WWAN radio 1530 may be configured to communicate with UEs over one or more carriers of a cellular WWAN (e.g., LTE/LTE-A, eHRPD, EV-DO, lx/HRPD, etc.). The backhaul core network interface 1535 may be configured to other eNodeBs and an evolved packet core network.

Figure 16:
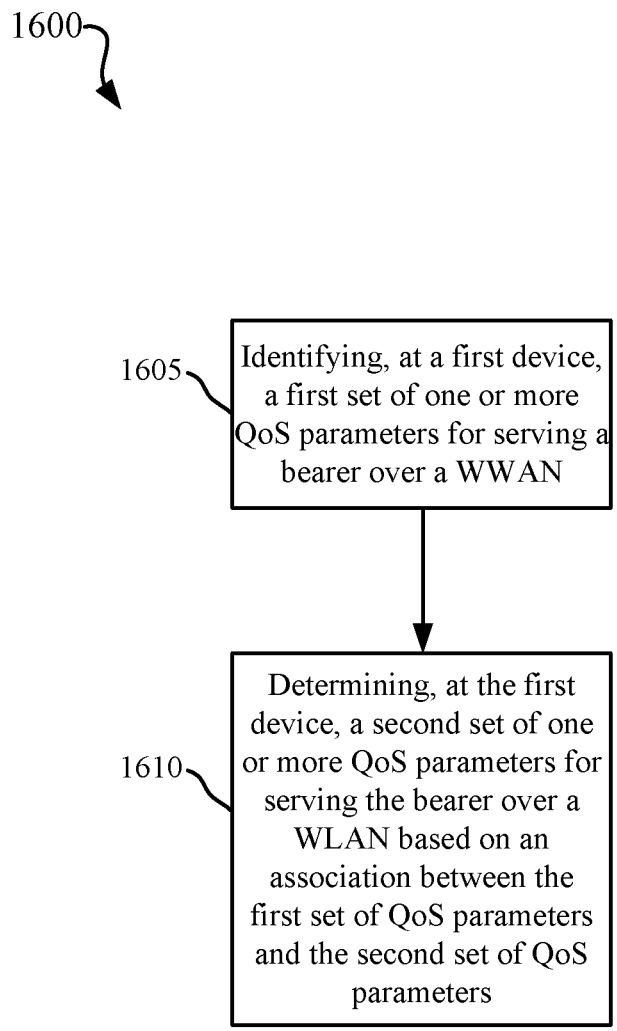
FIG. 16 is a flowchart conceptually illustrating an example of a method of wireless communication, in accordance with an aspect of the present disclosure.

FIG. 16 is a flowchart conceptually illustrating an example of a method 1600 of wireless communication, in accordance with an aspect of the present disclosure. Specifically, FIG. 16 illustrates a method 1600 of managing wireless communications in a wireless communication system. The method 1600 may be performed, for example, by one or more of the UEs, eNodeBs, MMEs, serving gateways, PDN gateways, or other devices described with reference to the other Figures.

At block 1605, a first set of one or more QoS parameters for serving a bearer over a WWAN may be identified at a first device. At block 1610, a second set of one or more QoS parameters for serving the bearer over a WLAN may be determined at the first device. The second set of QoS parameters may be determined based on an association between the first set of QoS parameter and the second set of QoS parameters.

Figure 17:
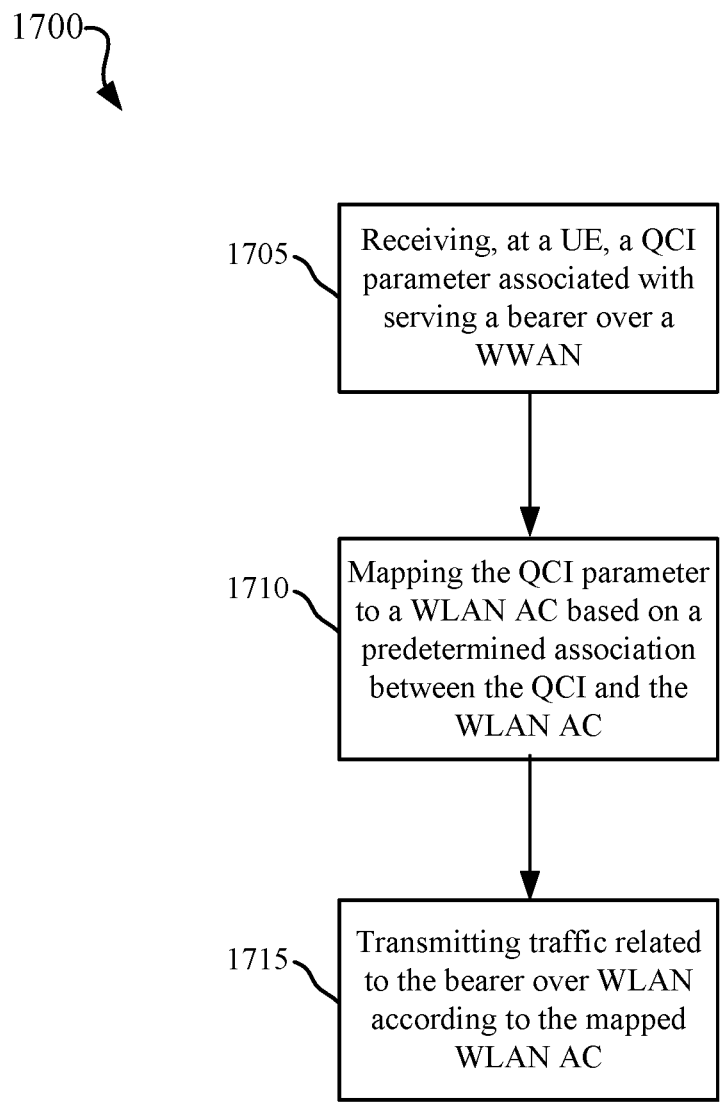
FIG. 17 is a flowchart conceptually illustrating an example of a method of wireless communication, in accordance with an aspect of the present disclosure.

FIG. 17 is a flowchart conceptually illustrating an example of a method 1700 of wireless communication, in accordance with an aspect of the present disclosure. Specifically, FIG. 16 illustrates a method 1700 of managing wireless communications in a wireless communication system. The method 1700 may be performed, for example, by one or more of the UEs described with reference to other Figures.

At block 1705, a QCI parameter associated with serving a bearer over a WWAN may be received at the UE (e.g., in a RRC or NAS message). At block 1710, the QCI parameter may be mapped to a WLAN AC based on an association between the QCI and the WLAN AC. At block 1715, the UE may transmit traffic related to the bearer over WLAN according to the mapped WLAN AC.

Figure 18:
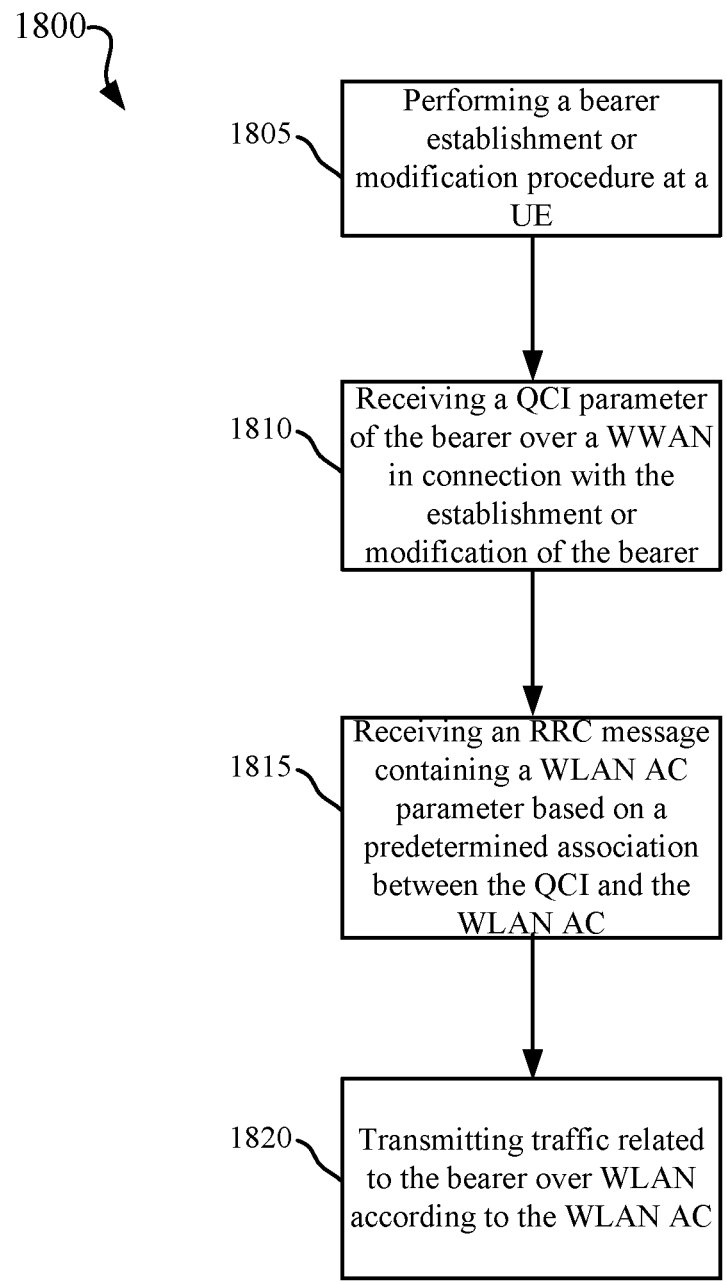
FIG. 18 is a flowchart conceptually illustrating an example of a method of wireless communication, in accordance with an aspect of the present disclosure.

FIG. 18 is a flowchart conceptually illustrating an example of a method 1800 of wireless communication, in accordance with an aspect of the present disclosure. Specifically, FIG. 16 illustrates a method 1800 of managing wireless communications in a wireless communication system. The method 1800 may be performed, for example, by one or more of the UEs described with reference to other Figures.

At block 1805, a bearer establishment or modification procedure may be performed at the UE. At block 1810, the UE may receive a QCI parameter of the bearer over a WWAN in connection with the establishment or modification of the bearer. At block 1815, the UE may receive an RRC message containing a WLAN AC parameter based on a predetermined association between the QCI and the WLAN AC. At block 1820, the UE may transmit traffic to the bearer over the WLAN according to the WLAN AC.

Figure 19:
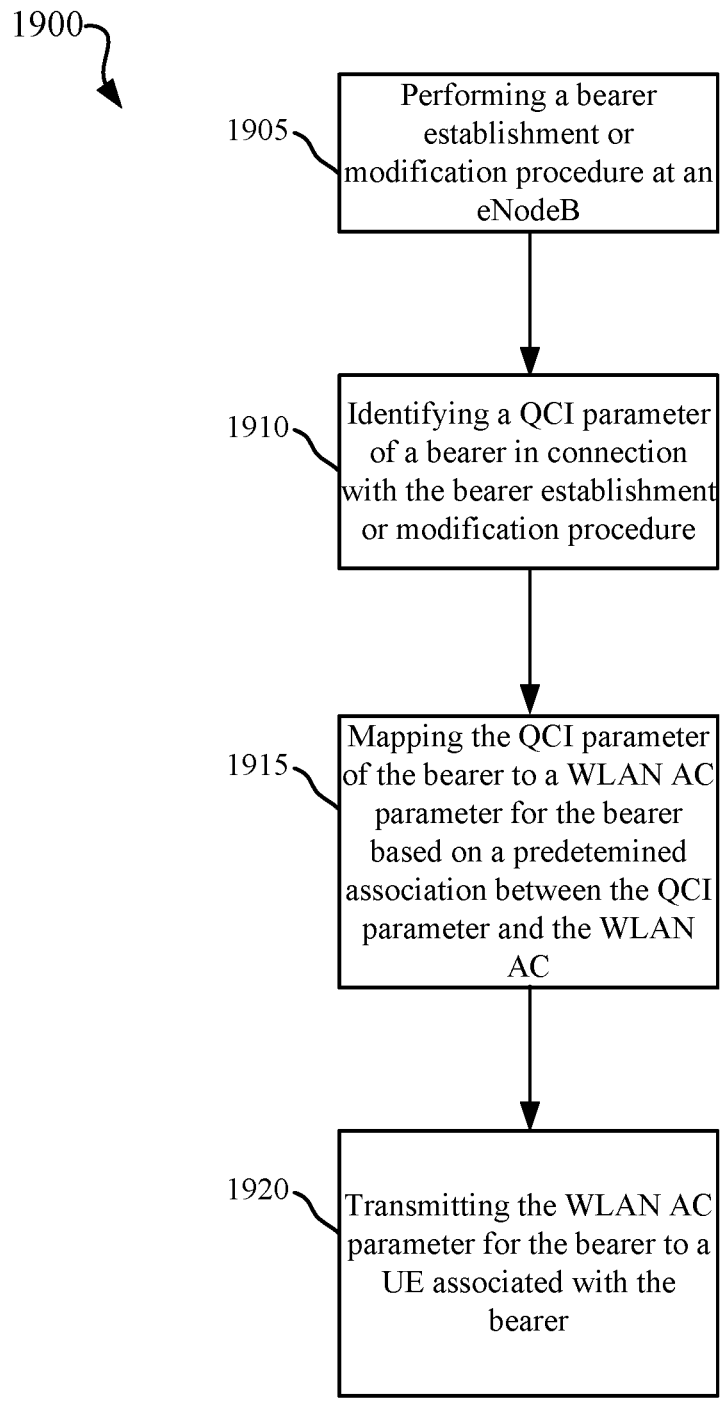
FIG. 19 is a flowchart conceptually illustrating an example of a method of wireless communication, in accordance with an aspect of the present disclosure.

FIG. 19 is a flowchart conceptually illustrating an example of a method 1900 of wireless communication, in accordance with an aspect of the present disclosure. Specifically, FIG. 19 illustrates a method 1900 of managing wireless communications in a wireless communication system. The method 1900 may be performed, for example, by one or more of the eNodeBs described with reference to other Figures.

At block 1905, a bearer establishment or modification procedure may be performed at the eNodeB. At block 1910, the eNodeB may identify a QCI parameter of the bearer in connection with the bearer establishment or modification procedure. At block 1915, the eNodeB may map the QCI parameter of the bearer to a WLAN AC parameter for the bearer based on a predetermined association between the QCI parameter and the WLAN AC. At block 1920, the eNodeB may transmit (e.g., in a RRC or NAS message) the WLAN AC parameter for the bearer to a UE associated with the bearer.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
    receiving, at a first device, a radio resource control (RRC) connection reconfiguration message comprising a data radio bearer configuration for a data radio bearer from a base station;
    identifying, at the first device, a first set of bearer parameters from the data radio bearer configuration;
    determining, at the first device, that a bearer type parameter is included in the first set of bearer parameters, the bearer type parameter indicating that the data radio bearer configuration for the data radio bearer is associated with a wide wireless area network (WWAN) or both the WWAN and a local wireless area network (WLAN);
    determining, at the first device, to split data associated with the data radio bearer between the WWAN and the WLAN based at least in part on the bearer type parameter; and
    routing, at the first device, the data associated with the data radio bearer based at least in part on the determination that the bearer type parameter is included in the first set of bearer parameters and the determination to split the data associated with the data radio bearer.

2. The method of claim 1, further comprising:
    determining, at the first device, that the bearer type parameter included in the first set of bearer parameters indicates that the data radio bearer is to be switched from the WWAN to the WLAN; and
    switching the data radio bearer from the WWAN to the WLAN based at least in part on the bearer type parameter, wherein routing the data radio bearer is based at least in part on switching the data radio bearer.

3. The method of claim 2, wherein the first set of bearer parameters include a WLAN quality-of-service (QoS) parameter to provide a QoS parameter to be associated with the data radio bearer when the radio bearer is switched between the WWAN and the WLAN.

4. The method of claim 1, further comprising:
    determining, at the first device, that the bearer type parameter included in the first set of bearer parameters indicates that the data radio bearer is to be switched from the WWAN to both the WWAN and the WLAN, wherein the first set of bearer parameters includes a WLAN quality-of-service (QoS) parameter to provide a QoS parameter to be associated with the data radio bearer when the data radio bearer is switched between the WWAN and both the WWAN and the WLAN.

5. The method of claim 3, further comprising:
    mapping, at the first device, a first QoS parameter associated with the WWAN to a second QoS parameter associated with the WLAN based at least in part on the WLAN QoS parameter.

6. The method of claim 5, wherein the first QoS parameter is a QoS class identifier (QCI) of the data radio bearer associated with the WWAN and the second QoS parameter is a WLAN access category (AC) associated with the WLAN.

7. The method of claim 5, wherein the mapping comprises a static mapping or a semi-static mapping.

8. The method of claim 1, further comprising:
    determining, at the first device, whether an identity parameter included in the first set of bearer parameters is part of a current configuration of the first device, wherein the data radio bearer is associated with the identity parameter.

9. The method of claim 8, wherein routing the data radio bearer is based at least in part on determining that the identity parameter included in the first set of bearer parameters is part of the current configuration of the first device.

10. The method of claim 1, further comprising:
    transmitting, at the first device, a connection completion message based at least in part on routing the radio bearer.

11. The method of claim 10, wherein the connection completion message is an RRC connection reconfiguration complete message.

12. The method of claim 1, wherein the data radio bearer comprises an evolved packet system (EPS) bearer.

13. An apparatus for wireless communication, comprising:
    means for receiving, at the apparatus, a radio resource control (RRC) connection reconfiguration message comprising a data radio bearer configuration for a data radio bearer from a base station;
    means for identifying, at the apparatus, a first set of bearer parameters from the data radio bearer configuration;
    means for determining, at the apparatus, that a bearer type parameter is included in the first set of bearer parameters, the bearer type parameter indicating that the data radio bearer configuration for the data radio bearer is associated with a wide wireless area network (WWAN) or both the WWAN and a local wireless area network (WLAN);

means for determining, at the apparatus, to split data associated with the data radio bearer between the WWAN and the WLAN based at least in part on the bearer type parameter; and means for routing, the data associated with the data radio bearer based at least in part on the determination that the bearer type parameter is included in the first set of bearer parameters and the determination to split the data associated with the data radio bearer.

14. The apparatus of claim 13, further comprising:

means for determining, at the apparatus, that the bearer type parameter included in the first set of bearer parameters indicates that the data radio bearer is to be switched from the WWAN to the WLAN; and means for switching the data radio bearer from the WWAN to the WLAN based at least in part on the bearer type parameter, wherein routing the data radio bearer is based at least in part on switching the data radio bearer.

15. The apparatus of claim 14, wherein the first set of bearer parameters include a WLAN quality-of-service (QoS) parameter to provide a QoS parameter to be associated with the data radio bearer when the data radio bearer is switched between the WWAN and the WLAN.

16. The apparatus of claim 13, further comprising:

means for determining, at the apparatus, that the bearer type parameter included in the first set of bearer parameters indicates that the data radio bearer is to be switched from the WWAN to both the WWAN and the WLAN, wherein the first set of bearer parameters include a WLAN quality-of-service (QoS) parameter to provide a QoS parameter to be associated with the data radio bearer when the data radio bearer is switched between the WWAN and both the WWAN and the WLAN.

17. An apparatus for wireless communication, comprising:

a processor;

memory in electronic communication with the processor; and instructions stored in the memory and executable by the processor to cause the apparatus to:

receive, at the apparatus, a radio resource control (RRC) connection reconfiguration message comprising a data radio bearer configuration for a data radio bearer from a base station;

identify, at the apparatus, a first set of bearer parameters from the data radio bearer configuration;

determine, at the apparatus, that a bearer type parameter is included in the first set of bearer parameters, the bearer type parameter indicating that the data radio bearer configuration for the data radio bearer is associated with a wide wireless area network (WWAN) or both the WWAN and a local wireless area network (WLAN);

determine, at the apparatus, to split data associated with the data radio bearer between the WWAN and the WLAN based at least in part on the bearer type parameter; and route, at the apparatus, the data associated with the data radio bearer based at least in part on the determination that the bearer type parameter is included in the first set of bearer parameters and the determination to split the data associated with the data radio bearer.

18. The apparatus of claim 17, wherein the instructions are further executable by the processor to cause the apparatus to:

determine, at the apparatus, that the bearer type parameter included in the first set of bearer parameters indicates that the data radio bearer is to be switched from the WWAN to the WLAN; and switch the data radio bearer from the WWAN to the WLAN based at least in part on the bearer type parameter, wherein routing the data radio bearer is based at least in part on switching the data radio bearer.

19. The apparatus of claim 18, wherein the first set of bearer parameters include a WLAN quality-of-service (QoS) parameter to provide a QoS parameter to be associated with the data radio bearer when the data radio bearer is switched between the WWAN and the WLAN.

20. The apparatus of claim 17, wherein the instructions are further executable by the processor to cause the apparatus to:

determine, at the apparatus, that the bearer type parameter included in the first set of bearer parameters indicates that the data radio bearer is to be switched from the WWAN to both the WWAN and the WLAN, wherein the first set of bearer parameters include a WLAN quality-of-service (QoS) parameter to provide a QoS parameter to be associated with the data radio bearer when the data radio bearer is switched between the WWAN and both the WWAN and the WLAN.

21. The apparatus of claim 19, wherein the instructions are further executable by the processor to cause the apparatus to:

map, at the apparatus, a first QoS parameter associated with the WWAN to a second QoS parameter associated with the WLAN based at least in part on the WLAN QoS parameter.

22. The apparatus of claim 21, wherein the first QoS parameter is a QoS class identifier (QCI) of the radio bearer associated with the WWAN and the second QoS parameter is a WLAN access category (AC) associated with the WLAN.

23. The apparatus of claim 21, wherein the mapping comprises a static mapping or a semi-static mapping.

24. The apparatus of claim 17, wherein the instructions are further executable by the processor to cause the apparatus to:

determine, at the apparatus, whether an identity parameter included in the first set of bearer parameters is part of a current configuration of the apparatus, wherein the data radio bearer is associated with the identity parameter.

25. The apparatus of claim 24, wherein routing the data radio bearer is based at least in part on determining that the identity parameter included in the first set of bearer parameters is part of the current configuration of the apparatus.

26. The apparatus of claim 17, wherein the instructions are further executable by the processor to cause the apparatus to:

transmit, at the apparatus, a connection completion message based at least in part on routing the radio bearer.

27. The apparatus of claim 26, wherein the connection completion message is an RRC connection reconfiguration complete message.

28. A non-transitory computer-readable medium storing code for wireless communication, the code comprising instructions executable by a processor to:
- receive, at a first device, a radio resource control (RRC) connection reconfiguration message comprising a data radio bearer configuration for a data radio bearer from a base station;
- identify, at the first device, a first set of bearer parameters from the data radio bearer configuration;
- determine, at the first device, that a bearer type parameter is included in the first set of bearer parameters, the bearer type parameter indicating that the data radio bearer configuration for the data radio bearer is associated with a wide wireless area network (WWAN) or both the WWAN and a local wireless area network (WLAN);
- determine, at the first device, to split data associated with the data radio bearer between the WWAN and the WLAN based at least in part on the bearer type parameter; and
- route, at the first device, the data associated with the data radio bearer based at least in part on the determination that the bearer type parameter is included in the first set of bearer parameters and the determination to split the data associated with the data radio bearer.

29. The non-transitory computer-readable medium of claim 28, wherein the instructions are further executable by the processor to:
- determine, at the first device, that the bearer type parameter included in the first set of bearer parameters indicates that the data radio bearer is to be switched from the WWAN to the WLAN; and
- switch the radio bearer from the WWAN to the WLAN based at least in part on the bearer type parameter, wherein the routing is based at least in part on the switching.

30. The non-transitory computer-readable medium of claim 29, wherein the first set of bearer parameters include a WLAN quality-of-service (QoS) parameter to provide a QoS parameter to be associated with the data radio bearer when the data radio bearer is switched between the WWAN and the WLAN.

* * * * *